(12) United States Patent
Park et al.

(10) Patent No.: US 11,256,381 B2
(45) Date of Patent: *Feb. 22, 2022

(54) METHOD FOR PROVIDING MESSAGE FUNCTION AND ELECTRONIC DEVICE THEREOF

(71) Applicant: Samsung Electronics Co., Ltd., Suwon-si (KR)

(72) Inventors: Chan-Woo Park, Seongnam-si (KR); Nam-Hoi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,433

(22) Filed: Dec. 20, 2018

(65) Prior Publication Data
US 2019/0121472 A1     Apr. 25, 2019

Related U.S. Application Data

(63) Continuation of application No. 13/956,755, filed on Aug. 1, 2013, now Pat. No. 10,191,608.

(30) Foreign Application Priority Data

Aug. 8, 2012    (KR) .................. 10-2012-0086750

(51) Int. Cl.
    *G06F 3/048*        (2013.01)
    *H04L 12/58*        (2006.01)
(Continued)

(52) U.S. Cl.
CPC .............. *G06F 3/048* (2013.01); *H04L 51/04* (2013.01); *H04L 51/16* (2013.01);
(Continued)

(58) Field of Classification Search
CPC ......... H04L 51/04; H04L 51/10; H04L 51/32; H04L 51/02; G06F 3/0482; G06F 3/048;
(Continued)

(56) References Cited

U.S. PATENT DOCUMENTS 6,434,604 B1    8/2002   Harada et al.
7,072,941 B2    7/2006   Griffin et al.
(Continued)

FOREIGN PATENT DOCUMENTS

CN       1682210 A      10/2005
CN       1989497 A      6/2007
(Continued)

OTHER PUBLICATIONS

Chinese Office Action with English translation dated Jul. 3, 2020; Chinese Appln. No. 201810744601.1.
(Continued)

*Primary Examiner* — Sang H Kim
(74) *Attorney, Agent, or Firm* — Jefferson IP Law, LLP

(57) ABSTRACT

A method for editing a message in an electronic device is provided. The method includes displaying transmitted and received messages in a chat window; detecting selection of a message to be edited among the displayed transmitted and received messages, and performing an editing operation according to an editing method for the selected message.

22 Claims, 16 Drawing Sheets

(51) Int. Cl.
*H04M 1/725* (2021.01)
*H04W 4/14* (2009.01)
*H04L 51/04* (2022.01)
*H04L 51/00* (2022.01)
*H04M 1/72436* (2021.01)

(52) U.S. Cl.
CPC ......... *H04M 1/72436* (2021.01); *H04W 4/14* (2013.01); *H04M 2250/22* (2013.01)

(58) Field of Classification Search
CPC ... G06F 3/0481; G06F 3/04842; G06F 3/0484
See application file for complete search history.

(56) References Cited

U.S. PATENT DOCUMENTS

| | | | |
|---|---|---|---|
| 7,222,299 | B1 | 5/2007 | Lim et al. |
| 7,502,831 | B1 | 3/2009 | Macias et al. |
| 7,917,582 | B2 | 3/2011 | Caspi et al. |
| 8,826,169 | B1 | 9/2014 | Yacoub et al. |
| 2003/0212746 | A1 | 11/2003 | Fitzpatrick et al. |
| 2004/0015548 | A1 | 1/2004 | Lee |
| 2004/0015553 | A1 | 1/2004 | Griffin et al. |
| 2004/0162877 | A1 | 8/2004 | Van Dok et al. |
| 2006/0026252 | A1 | 2/2006 | Caspi et al. |
| 2006/0075053 | A1 | 4/2006 | Xu et al. |
| 2006/0150087 | A1* | 7/2006 | Cronenberger ....... G06F 40/169 715/256 |
| 2006/0206566 | A1 | 9/2006 | Kelley et al. |
| 2007/0124387 | A1 | 5/2007 | Galloway |
| 2007/0214424 | A1 | 9/2007 | Gilead et al. |
| 2007/0232277 | A1 | 10/2007 | Spalink |
| 2007/0238489 | A1 | 10/2007 | Scott |
| 2007/0266090 | A1* | 11/2007 | Len ....................... G06F 40/103 709/204 |
| 2008/0114848 | A1* | 5/2008 | Lira ..................... G06Q 10/107 709/206 |
| 2009/0089686 | A1 | 4/2009 | Chen |
| 2009/0089693 | A1* | 4/2009 | Fahy ..................... G06F 40/174 715/764 |
| 2009/0259932 | A1* | 10/2009 | Bank ................... G06F 21/6209 715/229 |
| 2010/0011317 | A1 | 1/2010 | Lee |
| 2010/0269114 | A1 | 10/2010 | Li et al. |
| 2010/0306706 | A1* | 12/2010 | Gill ........................ G06F 3/0482 715/839 |
| 2010/0332518 | A1 | 12/2010 | Song et al. |
| 2011/0004841 | A1* | 1/2011 | Gildred ................ H04N 1/0044 715/780 |
| 2011/0202836 | A1* | 8/2011 | Badger ................. G06F 3/0237 715/702 |
| 2014/0223572 | A1 | 8/2014 | Roh |
| 2014/0304508 | A1 | 10/2014 | Murphy et al. |

FOREIGN PATENT DOCUMENTS

| | | |
|---|---|---|
| CN | 101047658 A | 10/2007 |
| CN | 101090409 A | 12/2007 |
| CN | 101535940 A | 9/2009 |
| EP | 1 868 110 A1 | 12/2007 |
| EP | 2222039 A1 | 8/2010 |
| JP | 11-203227 A | 8/2002 |
| JP | 2007328471 A | 12/2007 |
| JP | 2009294880 A | 12/2009 |
| KR | 10-2004-0045189 A | 6/2004 |
| KR | 10-2010-0110148 A | 10/2010 |
| KR | 10-2011-0000056 A | 1/2011 |
| KR | 10-2011-0099963 A | 9/2011 |

OTHER PUBLICATIONS

Kanayo Ogura, "A Multithread-oriented Multimodal Chat System Mixedly Using Voice and Text", IPSJ SIG Technical Reports, Jul. 6, 2007, pp. 17-24, vol. 2007, No. 68.
"Nanapi Web Method for modifying one's message during chatting on Skype", May 27, 2012.
European Office Action dated Oct. 24, 2018; European Appln. No. 13 178 996.8-1218.
Korean Office Action with English translation dated Oct. 22, 2018; Korean Appln. No. 10-2012-0086750.

* cited by examiner

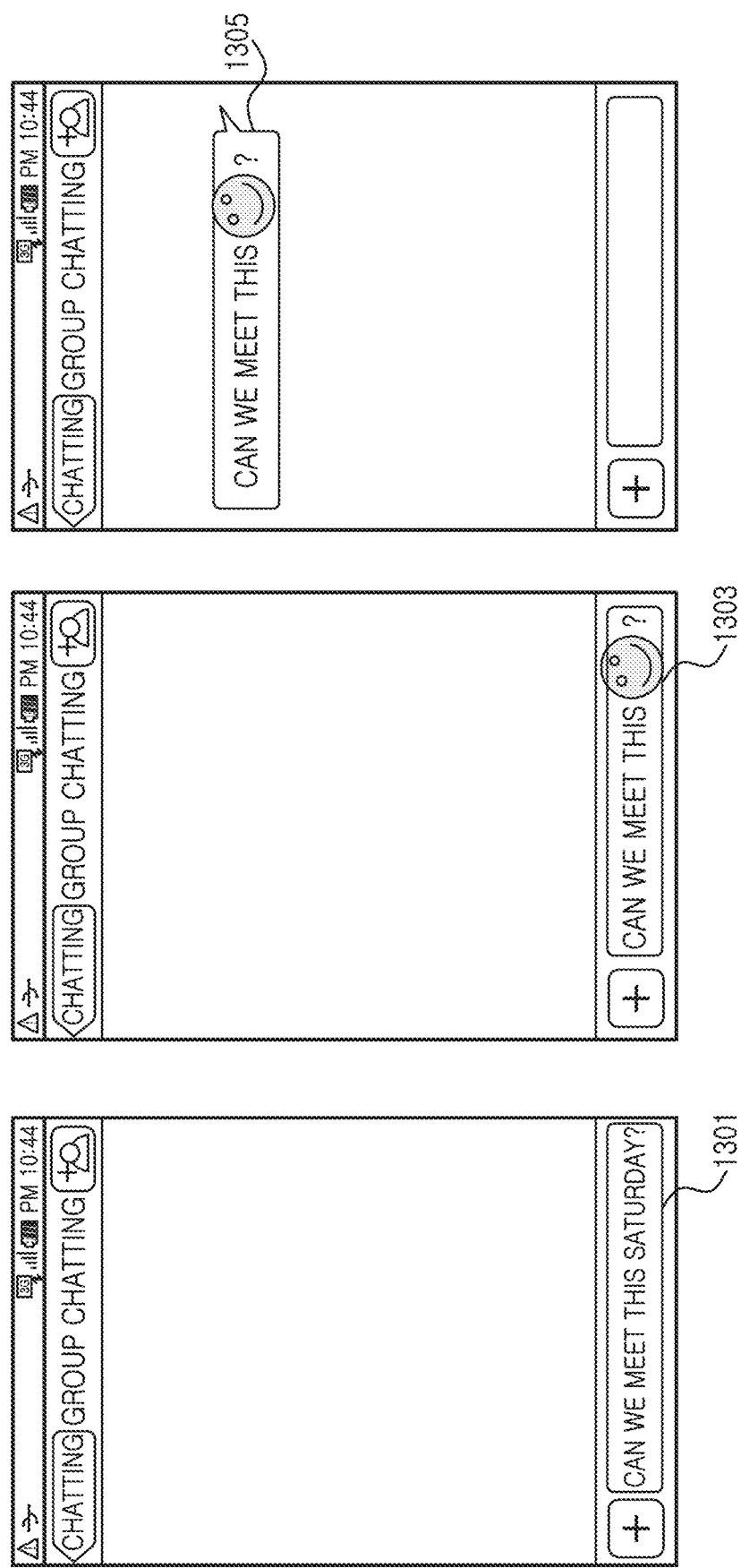

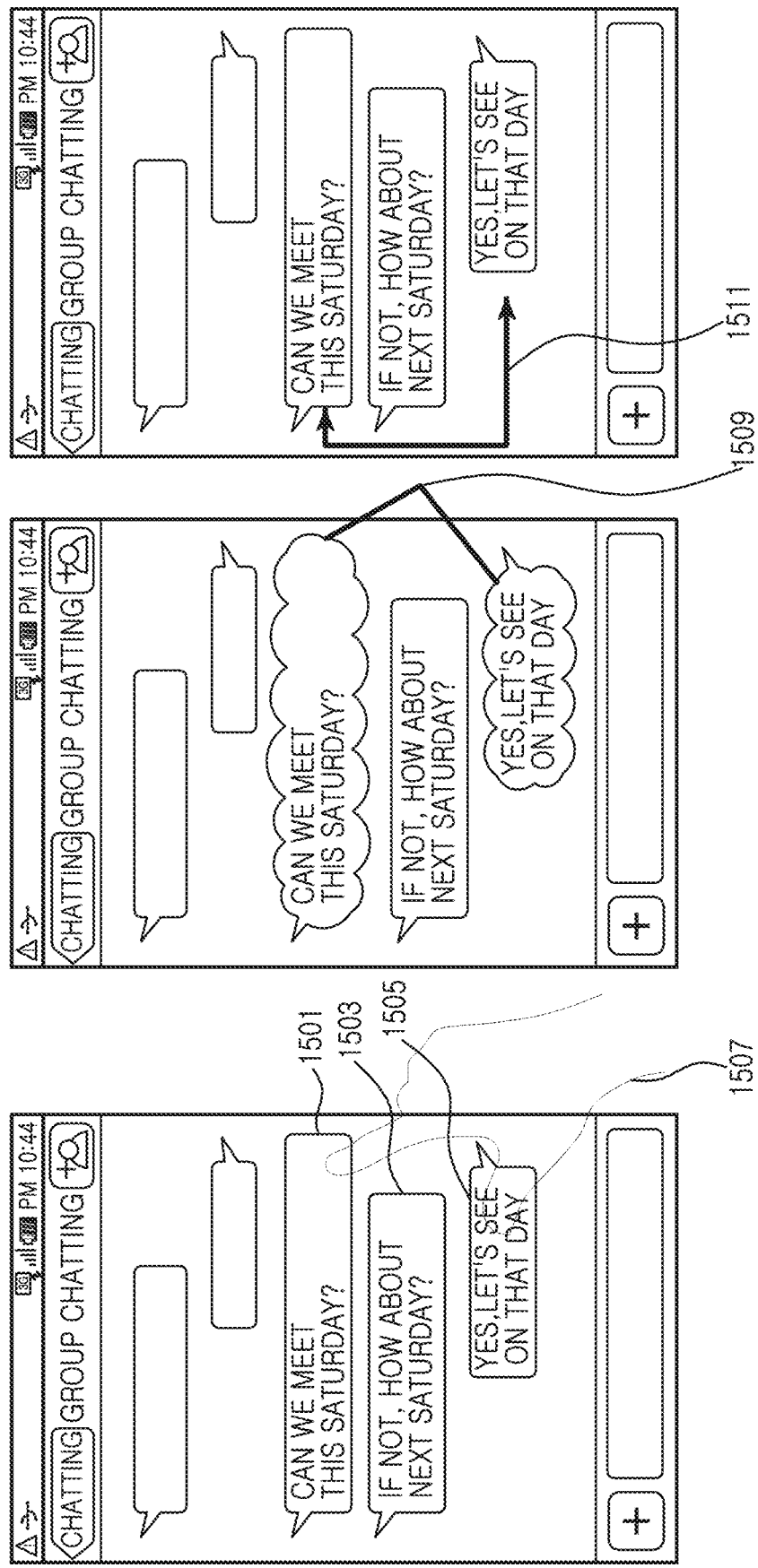

METHOD FOR PROVIDING MESSAGE FUNCTION AND ELECTRONIC DEVICE THEREOF

PRIORITY

This application is a continuation application of prior application Ser. No. 13/956,755, filed on Aug. 1, 2013, which claimed the benefit under 35 U.S.C. § 119 of a Korean patent application filed on Aug. 8, 2012 in the Korean Intellectual Property Office and assigned Serial No. 10-2012-0086750, the entire disclosure of which is hereby incorporated by reference.

BACKGROUND OF THE INVENTION

1. Field of the Invention

The present invention relates to a method of messaging function in an electronic device and the electronic device thereof. More particularly, the present invention relates to an apparatus and method for displaying messages in a chat window in an electronic device.

2. Description of the Related Art

Recently, an electronic device such as a portable terminal has become a necessity of modern life. The electronic device is widely used across a wide variety of user demographics. Service providers and terminal manufacturers competitively develop products (or services) for differentiation from other companies.

For example, the electronic device has developed into a multimedia device, which can provide a phonebook, games, a Short Message Service (SMS), an electronic mail (e-mail) function, an alarm clock function, a Motion Picture Expert Group Audio Layer-3 (MP3) player, a schedule management function (e.g., a calendar function), a digital camera, a multimedia message, and a wireless Internet service, various associated services, and the like.

Among the above functions of the electronic device, the SMS function is frequently used by users due to the advantage of relatively low costs relative to a voice call.

In addition, recently, the electronic device has been designed to provide a Multimedia Message Service (MMS), which has a combination of the advantages associated with the SMS and the advantages associated with the e-mail service.

The MMS is a messaging service for transmitting/receiving text, music, images, moving pictures, link information, and the like, either individually or in combination. A user can transmit a wireless postcard, pictures, moving pictures, a video card map, a business card, or the like through the MMS.

In addition, the electronic device provides an interactive messaging (instant messaging) function to allow users to transmit and receive messages through a chat window.

An electronic device according to the related art stores and manages transmitted and received messages in a classified manner. However, the interactive messaging function stores the transmitted and received messages in chronological order such that the messages are stored in a dialog form.

According to the related art, the electronic device displays the interactive message in a speech balloon including the content of the message according to the corresponding message input time.

FIGS. 1A to 1C are diagrams illustrating an interactive message screen provided by an electronic device according to the related art.

Referring to FIGS. 1A to 1C, the electronic device provides an interactive messaging function by displaying a screen having a chat window and an input window.

The chat window is a region in which the contents of transmitted and received messages are displayed. The locations of displayed messages are determined according to the transmission and reception times of the messages. In addition, the input window is a region to which messages to be transmitted to a counterpart user are input. The messages input to the input window are displayed in a chat window while being transmitted to the counterpart user.

Generally, the user of the electronic device transmits a response message in response to a message received from a counterpart user. FIG. 1A illustrates a situation in which the user of the electronic device inputs a message 103 to the input window in order to respond to a message 101 received from the counterpart user.

In this case, when the user presses a transmission button, the electronic device updates the chat window while transmitting the message input to the input window to the counterpart user.

However, according to the related art, when another message 105 is received from the counterpart user before the user presses a transmission button, as illustrated in FIG. 1B, the message 103 input to the input window is displayed as message 107 and located after a newly received message as illustrated in FIG. 1C.

In this case, it may be difficult for the counterpart user to determine which message corresponds to the message input by the user. Similarly, the user of the electronic device may not notice (and thus respond to) message 105 which is displayed between the received message 101 to which the input message 103 responds.

As an example, as illustrated in FIG. 1C, the counterpart user cannot determine whether the user responds to a message "Can we meet this Saturday?" or a message "If not, how about next Saturday?"

Generally, when the above situation occurs, the user or the counterpart user needs to transmit a message clarifying such a potential misunderstanding.

In addition, because the messages displayed in the chat window cannot be corrected, the user needs to correct erroneous content and transmit a corrected message.

Therefore, there is a need for an apparatus and method for modifying the location and content of a pre-transmitted message in order to resolve the above-described problem.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for grouping messages associated with each other among messages displayed in a chat window in an electronic device.

Another aspect of the present invention is to provide an apparatus and method for modifying a location of a message displayed in a chat window in an electronic device.

Another aspect of the present invention is to provide an apparatus and method for modifying the content of a message displayed in a chat window in an electronic device.

Another aspect of the present invention is to provide an apparatus and method for combining messages displayed in a chat window with each other in an electronic device.

Another aspect of the present invention is to provide an apparatus and method for transmitting and displaying a message to which a special effect has been applied in a chat window in an electronic device.

In accordance with an aspect of the present invention, a method for editing a message in an electronic device is provided. The method includes displaying transmitted and received messages in a chat window, detecting selection of a message to be edited among the displayed transmitted and received messages, and editing the selected message according to an editing method for the selected message.

In accordance with an aspect of the present invention, an electronic device for editing a message is provided. The electronic device includes at least one processor, a memory, and at least one program stored in the memory and configured to be executable by the processor, wherein the at least one program includes an instruction for displaying transmitted and received messages in a chat window, an instruction for detecting selection of a message to be edited among the displayed transmitted and received messages, and an instruction for editing the selected message according to an editing method.

In accordance with an aspect of the present invention, a non-transitory computer-readable recording medium storing one or more programs comprising instructions for causing, when executed by an electronic device to perform a method, is provided. The method performed by the electronic device includes displaying transmitted and received messages in a chat window detecting selection of a message to be edited among the displayed transmitted and received messages and editing the selected message according to an editing method for the selected message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will become more apparent from the following description taken in conjunction with the accompanying drawings in which:

FIGS. 13A to 13C are diagrams illustrating screens for transmitting a message to which a special effect has been applied in an electronic device according to an exemplary embodiment of the present invention;

FIGS. 15A to 15C are diagrams illustrating screens for displaying a speech balloon in a chat window in an electronic device according to an exemplary embodiment of the present invention;

Throughout the drawings, like reference numerals will be understood to refer to like parts, components, and structures.

DETAILED DESCRIPTION OF EXEMPLARY EMBODIMENTS

Figure 1C:
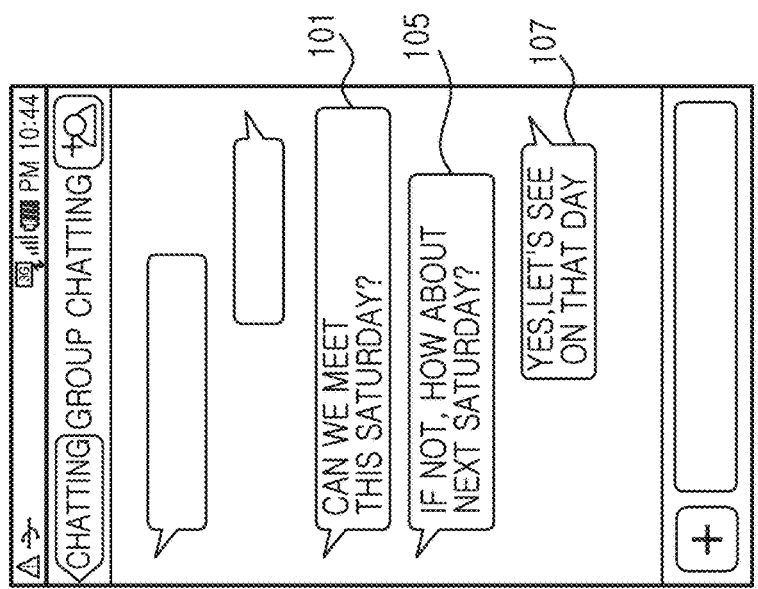
FIGS. 1A to 1C are diagrams illustrating interactive message screens provided in an electronic device according to the related art.
Figure 1B:
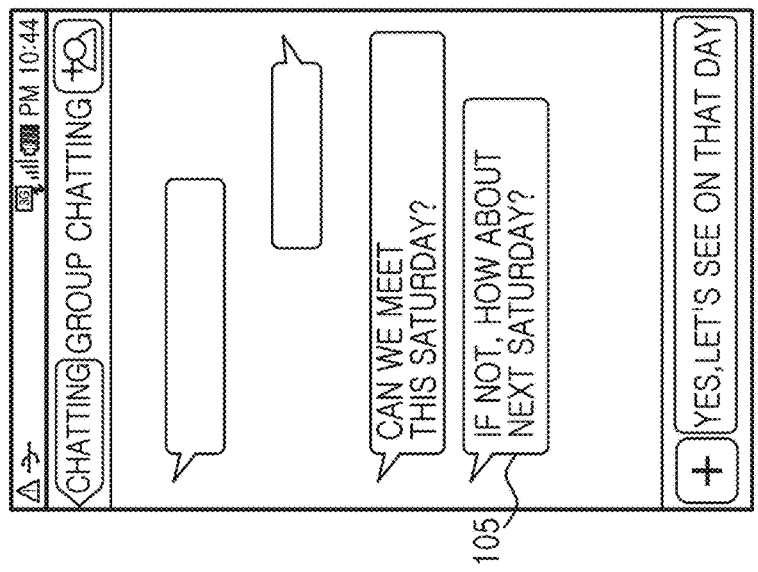
Figure 1A:
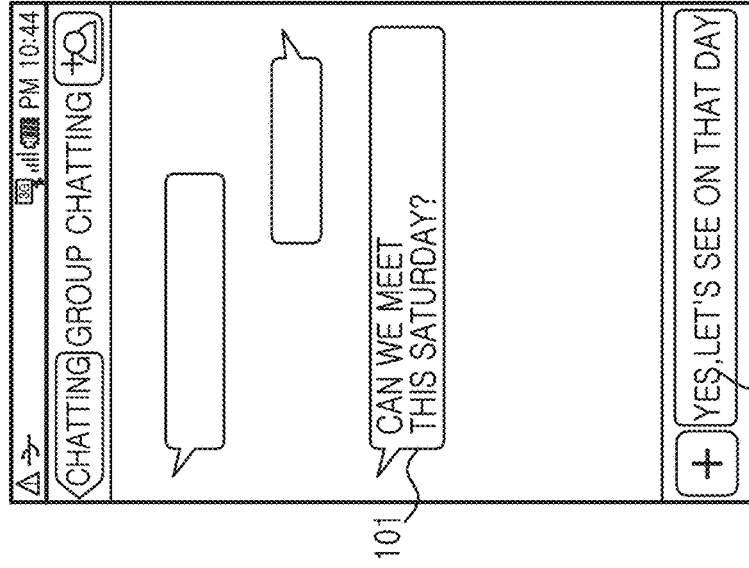

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an apparatus and method for editing a message (e.g., a dialog) of previously input interactive messages to improve a messaging function in an electronic device according to exemplary embodiments of the present invention will be described.

According to exemplary embodiments of the present invention, the electronic device may modify the location and content of a message displayed in a chat window.

The message corresponds the content of a message transmitted and received by the electronic device, and may have the same meaning as a speech balloon, dialog, or the like which will be described below.

According to exemplary embodiments of the present invention, the electronic device may be a portable electronic device, and examples thereof may include a portable terminal, a mobile phone, a media player, a tablet computer, a handheld computer, or a Personal Digital Assistant (PDA), a Portable/Personal Multimedia Player (PMP), a handheld e-book, a Global Positioning System (GPS) navigation, a portable game console, a digital camera, and the like. In addition, the electronic device may be any one portable electronic device having a combination of the functions of two or more devices among the above-described devices, and the electronic device may include a touchscreen.

According to exemplary embodiments of the present invention, the electronic device may also include any type of electronic device including a message transmission unit. For example, the electronic device may include a desktop computer, a refrigerator, a multi-function peripheral, a video game console, a digital camera, a Mobile Internet Device (MID), an Ultra Mobile Personal Computer (UMPC), a navigation, a smart TV, a digital clock, an MPEG Audio Layer-3 (MP3) player, and the like.

Figure 2:
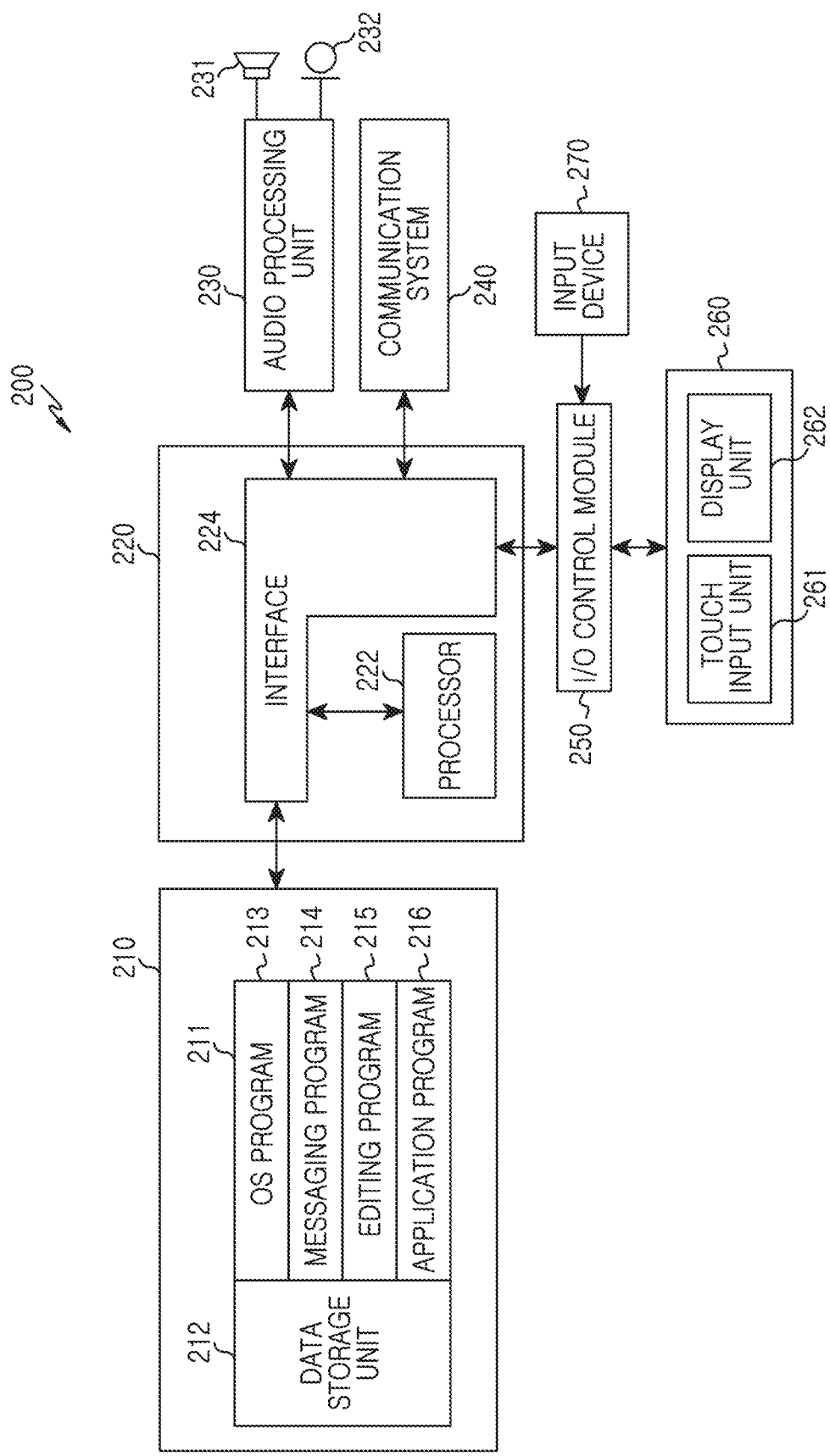
FIG. 2 is a block diagram illustrating a configuration of an electronic device for providing a message editing function according to an exemplary embodiment of the present invention.

FIG. 2 is a block diagram illustrating a configuration of an electronic device for providing a message editing function according to an exemplary embodiment of the present invention.

Referring to FIG. 2, the electronic device 200 may include a memory 210, a processor unit 220, an audio processing unit 230, a communication system 240, an Input/Output (I/O) control module 250, a touchscreen 260, and an input device 270. According to exemplary embodiments of the present invention, one or more of the above-described components may be provided in plurality. For example, the electronic device may include a plurality of memories 210, a plurality of communication systems 240, and the like.

The respective components will be described below.

The memory 210 may include a program storage unit 211 for storing a program for controlling an operation of the electronic device 200, and a data storage unit 212 for storing data generated during the execution of a program. For example, the data storage unit 212 may store a variety of updatable storage data, such as a phone book, transmitted messages, received messages, and the like.

The program storage unit 211 may include an Operating System (OS) program 213, a messaging program 214, an editing program 215, and at least one application program 216. The programs stored in the program storage unit 211 may be expressed as an instruction set corresponding to a collection of instructions. The programs stored in the program storage unit 111 may be expressed as hardware configurations. For example, the electronic device may include an OS module, a messaging module, an editing module, and the like.

The OS program 213 may include various software components for controlling general system operations. For example, general system operation controls may include memory control/management, storage hardware (device) control/management, power control/management, and the like. The OS program 213 may also perform a function for enabling smooth communication between various hardware components (devices) and program components (modules).

The messaging program 214 may include at least one software component for performing a function for managing transmitted and received messages. For example, when the messaging function is performed, the messaging program 214 may display a screen having a chat window and an input window. The chat window may be a region in which transmitted and received messages (e.g., a dialog) are displayed. The input window may be a region to which a message to be transmitted is input.

The messaging program 214 may display the transmitted and received messages in the chat window in chronological order.

In addition, when receiving a message which a special effect has been applied to, the messaging program 214 may display the message with the special effect applied thereto, and release the special effect when authentication information is input from a user.

The editing program 215 may include at least one software component for editing a message displayed in the chat window. For example, the editing program 215 may modify the location and content of the message displayed in the chat window. In addition, the editing program 215 may group messages displayed in the chat window. The grouping of the messages may correspond to grouping messages associated with each other among the displayed messages. In addition, the editing program 215 may edit the messages displayed in the chat window such that an addition, a deletion, a hiding effect, and/or the like is applied to the displayed messages.

In addition, the editing program 215 may perform an editing operation such that the hiding effect is applied to a message to be transmitted, and transmit the hidden message to a counterpart user.

According to exemplary embodiments of the present invention, the messaging program 214 and the editing program 215 may be combined into a single program. For example, the messaging program 214 may include the instructions associated with the editing program 215.

The application program 216 may include a software component for at least one application program installed in the electronic device 200.

The processor unit 220 may include at least one processor 222 and an interface 224. The processor 222 and the interface 224 may be integrated into at least one integrated circuit or may be implemented as separate components.

The interface 224 may perform a function of a memory interface for controlling access to the processor 222 and the memory 210. In addition, the interface 224 may perform a function of a peripheral interface for controlling connections between I/O peripheral devices of the electronic device 200 and the processor 222.

The processor 222 may perform control such that the electronic device 200 provides a message editing function, by using at least one software program. The processor 222 may execute at least one program stored in the memory 210 to provide a message editing function corresponding to the program. For example, the processor 222 may include a message editing processor for performing the editing function. For example, the message editing function of the electronic device 200 may be performed by using software such as the program stored in the memory 210, by using hardware such as the message editing processor, or a combination thereof.

The audio processing unit 230 may provide an audio interface between a user and the electronic device 200 through a speaker 231 and a microphone 232.

The communication system 240 may perform communication functions for voice communication and data communication of the electronic device 200. For example, the communication system 240 may include a plurality of communication sub-modules which support different communication networks. For example, the communication networks may include a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless LAN, a Bluetooth network, Near Field Communication (NFC), and the like.

According to exemplary embodiments of the present invention, the communication system 240 may perform an operation for transmitting and receiving edited messages or information about the edited messages.

The I/O control module 250 may provide an interface between an input/output device, such as the touchscreen 260 and the input device 270, and the interface 224.

The touchscreen 260 corresponds to an input/output device for performing the input and output of information and may include a touch input unit 261 and a display unit 262.

The touch input unit 261 may provide touch information detected through a touch panel to the processor unit 220 through the I/O control module 250. The touch input unit 261 may convert the touch information into the form of an instruction, such as a touch down instruction, a touch move instruction, a touch up instruction, and the like. The touch input unit 261 may provide the instruction (e.g., converted from the touch information) to the processor unit 220.

The display unit 262 may display the state information of the electronic device 200, characters input by the user, moving pictures, still pictures, or the like. For example, the display unit 262 may display transmitted and received messages and a message editing process. In addition, the display unit 262 may display messages edited through the message editing process.

The input device 270 may provide input data generated by the user's selection to the processor unit 220 through the I/O control module 250. For example, the input device 270 may include only control buttons for control of the electronic device 200. As another example, the input device 270 may include a keypad for receiving the input data from the user. Accordingly, the input device 270 may provide the processor unit 220 with an instruction for selecting a message to be edited and editing the selected message (for example, a message with which an editing message is to be replaced).

Although not illustrated, the electronic device may further include components for providing additional functions, such as a camera module for capturing images and/or moving pictures, a broadcast receiving module for receiving broadcasts, a digital sound playback module such as an MP3 module, a short-distance wireless communication module for short-distance wireless communication, a proximity sensor for sensing proximity, or the like, and software for the components' operations.

An electronic device according to various exemplary embodiments of the present invention includes at least one processor, a memory, and at least one program stored in the memory and configured to be executable by the processor. The program includes an instruction for displaying transmitted and received messages in a chat window, an instruction for detecting selection of a message to be edited among the displayed transmitted and received messages, and an instruction for editing the selected message according to an editing method.

According to exemplary embodiments of the present invention, the program includes an instruction for executing at least one operation among message grouping, message location modification, message addition, message deletion, message highlighting, message hiding, message combination, application association, and the like.

According to exemplary embodiments of the present invention, the program includes an instruction for receiving selection of at least one message to be grouped with the selected message, and an instruction for displaying the selected messages as a group.

According to exemplary embodiments of the present invention, the program includes an instruction for performing at least one of modifying a shape of the selected message, an instruction for modifying a color of the selected message, and an instruction for connecting the selected messages with a line.

According to exemplary embodiments of the present invention, the program includes an instruction for determining a movement location of the selected message, and an instruction for moving the selected message to the determined location.

According to exemplary embodiments of the present invention, the program includes an instruction for receiving selection of a region to be edited in the selected message, an instruction for receiving a message replacing the selected region, and an instruction for replacing the message of the selected region with the received message.

According to exemplary embodiments of the present invention, the program includes an instruction for receiving selection of at least one message to be combined with the selected message, and an instruction for combining the selected messages into one message.

According to exemplary embodiments of the present invention, the program includes an instruction for editing a message to be transmitted, and an instruction for transmitting the edited message.

Figure 3:
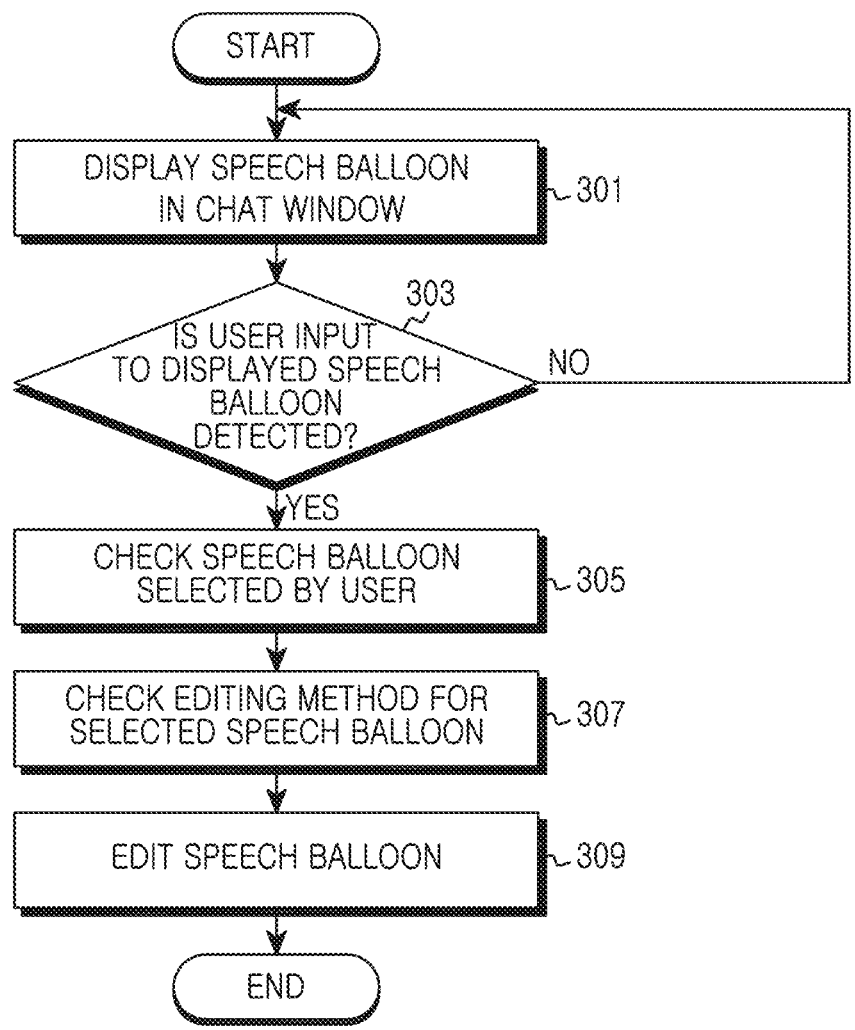
FIG. 3 is a flowchart illustrating a process for providing a messaging function in an electronic device according to an exemplary embodiment of the present invention.

FIG. 3 is a flowchart illustrating a process for providing a messaging function in an electronic device according to the present invention.

Referring to FIG. 3, the electronic device may provide a messaging function for transmitting a message (e.g., a dialog) input to an input window and for displaying transmitted and received messages in a chat window in chronological order. For example, when the messaging function is performed, the electronic device may display a screen having the chat window and the input window and thereafter, display a message received from a counterpart user in the chat window. In addition, when detecting a transmission request from a user who has input the message to the input window, the electronic device may transmit the message input to the input window to the counterpart user and, at substantially the same time, display the transmitted message in the chat window.

Because each message is included within each speech balloon, the transmitted and received messages are distinguished from each other.

In order to provide the messaging function, in step 301, the electronic device may display speech balloons in the chat.

In step 303, the electronic device determines whether a user input to displayed speech balloon is detected. For example, the electronic device may determine whether a user request for selecting a speech balloon is generated in operation 303.

Herein, the speech balloon displayed in the chat window corresponds to a state in which the user has transmitted/received a message to/from the counterpart user through the messaging function. The displayed speech balloon may be a transmission or reception speech balloon displayed in the chat window.

If the electronic device determines that the user input for selection of the displayed speech balloon is not detected in step 303, then the electronic device returns to step 301 in which the electronic device may display messages transmitted/received to/from the counterpart user.

In contrast, if the electronic device determines that the user input for selection of the displayed speech balloon is detected in step 303, then the electronic device proceeds to step 305 in which the electronic device may determine the speech balloon selected by the user.

Thereafter, in step 307, the electronic device determines an editing method for the selected speech balloon. The editing method for the speech balloon may include a method for modifying the location of the displayed speech balloon.

In addition, according to exemplary embodiments of the present invention, the editing method for the speech balloon may include message addition to the speech balloon, message deletion from the speech balloon, message highlighting, message hiding, and the like.

In addition, according to exemplary embodiments of the present invention, the editing method for the speech balloon may include a method for combining a plurality of displayed speech balloons into one speech balloon.

In addition, according to exemplary embodiments of the present invention, the editing method for the speech balloon may include a method for associating a message included in the speech balloon with an application. For example, a message included in the speech balloon may be registered in a memo, a scheduler, a phone number, or the like. As another example, a web search, a phone number search, a location search, or the like may be performed by using a message as a search key word.

In step 309, the electronic device may edit the speech balloon by using the determined editing method.

Figure 4:
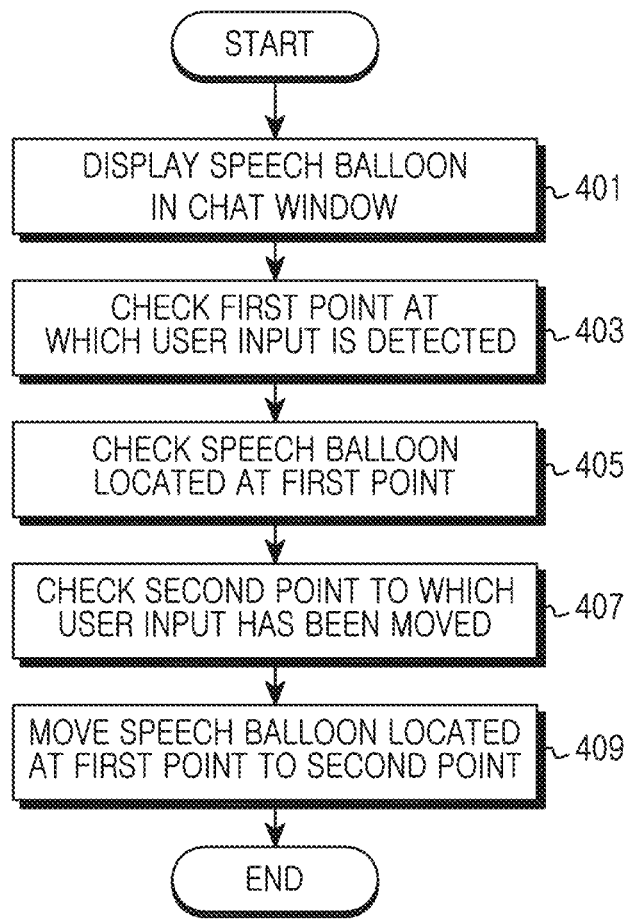
FIG. 4 is a flowchart illustrating a process for editing a message in an electronic device according to an exemplary embodiment of the present invention.

FIG. 4 is a flowchart illustrating a process for editing a message in an electronic device according to an exemplary embodiment of the present invention.

Referring to FIG. 4, in step 401, the electronic device may display a speech balloon in a chat window in order to modify the location of the speech balloon displayed in the chat window. The speech balloon may be a region for distinguishing messages (e.g., a dialog) displayed in the chat window from each other.

In step 403, the electronic device may determine a first point at which a user input is detected.

In step 405, the electronic device may determine a speech balloon located at the first point. As an example, the first point may be a point at which the speech balloon for location modification is selected.

In step 407, the electronic device may determine a second point to which the user input has been moved. As an example, the second point may be a point to which the speech balloon selected by the user is to be moved.

In step 409, the electronic device may move the speech balloon located at the first point to the second point.

For example, in a case in which five speech balloons are displayed in the chat window, the respective speech balloons may be defined as a first balloon, a second balloon, a third balloon, a fourth balloon, and a fifth balloon according to the display order of the respective speech balloons.

If a massage is formed of a pair of the third and fifth speech balloons but the fourth speech balloon is displayed earlier than the fifth speech balloon due to delay of message transmission (e.g., if the fourth speech balloon is displayed as an intervening message between the third and fifth speech balloons as a result of, for example, a delay of message transmission), the user may select and move the fifth speech balloon above the fourth speech balloon such that the third speech balloon is paired with the fifth speech balloon. For example, by the movement of the fifth speech balloon, the displayed speech balloons may be rearranged in order of the first speech balloon, the second balloon, the third balloon, the fifth balloon, and the fourth balloon.

Figure 5:
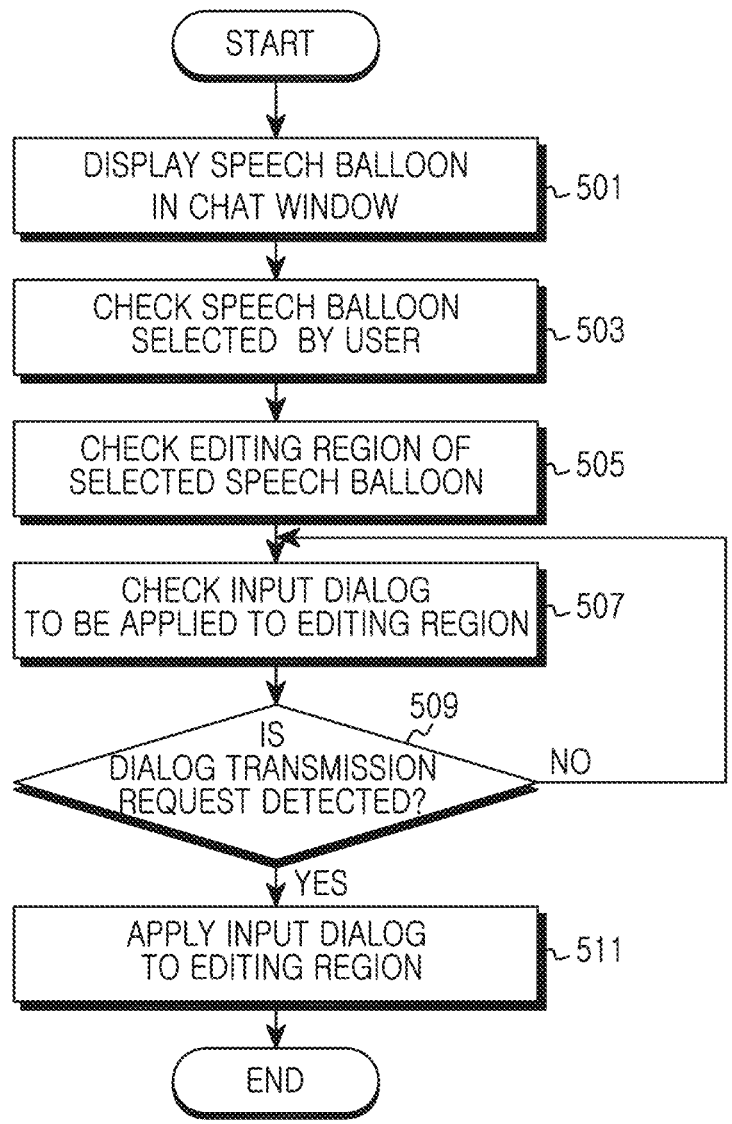
FIG. 5 is a flowchart illustrating a process for editing a message in an electronic device according to an exemplary embodiment of the present invention.

FIG. 5 is a flowchart illustrating a process for editing a message in an electronic device according to an exemplary embodiment of the present invention.

Referring to FIG. 5, in step 501, the electronic device may display a speech balloon in a chat window in order to add a message (e.g., dialog) to the speech balloon included in the chat window or to modify a message of the speech balloon. The speech balloon may be a region for distinguishing messages (e.g., a dialog) displayed in the chat window from each other.

In step 503, the electronic device may determine the speech balloon selected by the user.

In step 505, the electronic device may determine an edit region of the selected speech balloon. As an example, the edit region of the speech balloon may correspond to a region to be edited in the message included in the speech balloon. The user may select the edit region with respect to all or some words of the message.

In step 507, the electronic device may determine the input message to be applied to the edit region.

In step 509, the electronic device may determine whether a message transmission request (dialog transmission request) is detected.

If the electronic device determines that the message transmission request is not detected in step 509, then the electronic device may return to step 507 in which the electronic device may determine the input message to be applied to the edit region.

In contrast, if the electronic device determines that the message transmission request is detected in step 509, the electronic device proceeds to step 511 in which the electronic device may apply the input message to the edit region.

In this case, the electronic device may add a newly input message to the speech balloon displayed in the chat window or replace the message of the speech balloon displayed in the chat window with the newly input message. In this case, the electronic device may apply a specific effect to the newly input message or the replaced part to distinguish the edited message. In addition, the electronic device may display an indication representing a deletion without deleting the displayed message, to prevent the content of an initial message from being modified by the user.

In addition, the electronic device may transmit information about the edit region (e.g., the speech balloon to be edited and the edit region of the speech balloon) and input data to a counterpart user to enable the message of the counterpart user to be edited.

Figure 6:
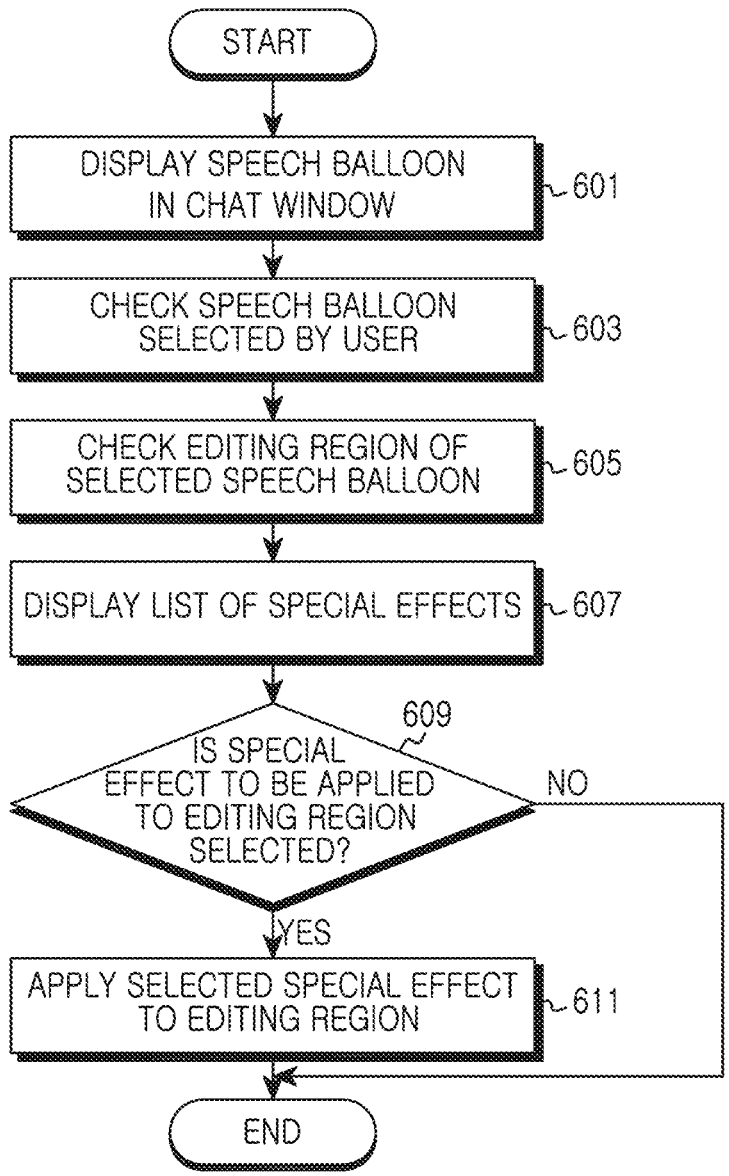
FIG. 6 is a flowchart illustrating a process for editing a message in an electronic device according to an exemplary embodiment of the present invention.

FIG. 6 is a flowchart illustrating a process for editing a message in an electronic device according to an exemplary embodiment of the present invention.

Referring to FIG. 6, in step 601, the electronic device may display a speech balloon in a chat window in order to highlight or hide a message (e.g., a dialog) of the speech balloon included in the chat window. The speech balloon may be a region for distinguishing messages displayed in the chat window from each other.

In step 603, the electronic device may determine the speech balloon selected by the user.

In step 605, the electronic device may determine an edit region of the selected speech balloon. The edit region of the speech balloon may correspond to a region to be edited in the message included in the speech balloon. The user may select the edit region with respect to all or some words of the message.

In step 607, the electronic device may display a list of special effects applicable to the edit region.

In step 609, the electronic device may determine whether a special effect to be applied to the edit region is selected by the user. The special effect applicable to the edit region may be a special effect of highlighting the message of the speech balloon. For example, the electronic device may apply a special effect for modifying the color of all or the particular word of the message or a special effect for flickering all or a particular word of the message of the speech balloon.

As an example, the special effect applicable to the edit region may be a special effect of hiding a message of the speech balloon. For example, the electronic device may perform mosaic processing on, or apply an animation effect designed by the user or images, and the like, to all or the particular word of the message of the speech balloon, thereby preventing the edit region from being exposed to others.

If the electronic device determines that the special effect to be applied to the edit region has not been selected in step 609, then the electronic device may maintain a state in which the chat window including the speech balloon has been displayed, or end the process.

In contrast, if the electronic device determines that the special effect to be applied to the edit region has been selected in step 609, then the electronic device may proceed to step 611 in which the electronic device may apply the selected special effect to the edit region.

Figure 7:
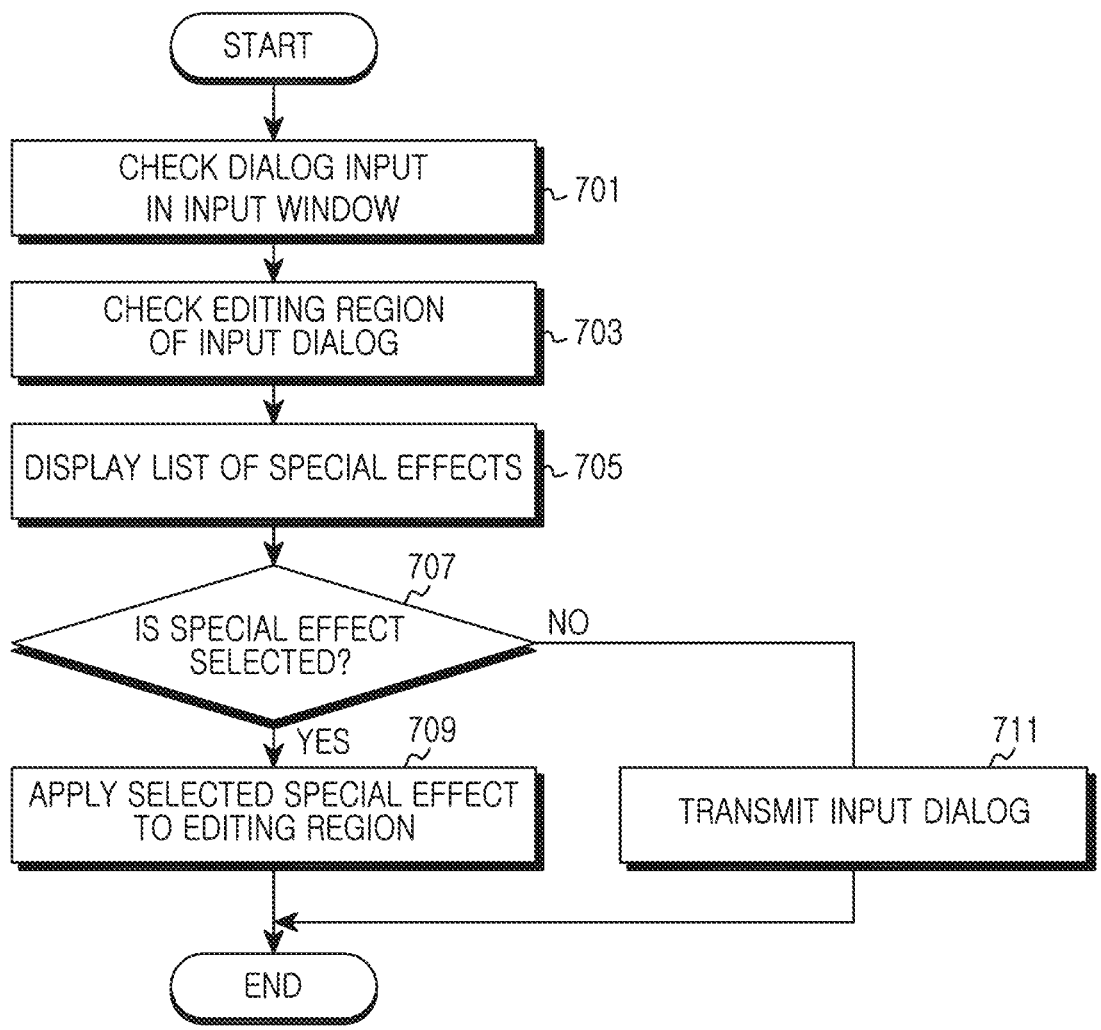
FIG. 7 is a flowchart illustrating a process for transmitting a message to which a special effect has been applied in an electronic device according to an exemplary embodiment of the present invention.

FIG. 7 is a flowchart illustrating a process for transmitting a message to which a special effect has been applied in an electronic device according to an exemplary embodiment of the present invention.

Referring to FIG. 7, the electronic device may edit and transmit a message to be transmitted, transmitted messages, and received messages (e.g., a dialog) as described above.

In order to perform the above-described operations, in step 701, the electronic device may determine a message (e.g., a dialog) input to an input window.

In step 703, the electronic device may determine an edit region of the input message. The edit region of the input message is a region to which a particular special effect is to be applied in the input message. The user may select the edit region with respect to all or some words of the message.

In step 705, the electronic device may display a list of special effects applicable to the edit region.

In step 707, the electronic device may determine whether a special effect to be applied to the edit region is selected by the user.

As an example, the special effect applicable to the edit region may be a special effect of highlighting the message of the speech balloon. For example, the electronic device may apply a special effect for modifying the color of all or the particular word of the message or a special effect for flickering all or a particular word of the message of the speech balloon.

As another example, the special effect applicable to the edit region may be a special effect of hiding a message of the speech balloon. For example, the electronic device may perform mosaic processing on, apply an animation effect designed by the user or images, and the like to all or the particular word of the message of the speech balloon, thereby preventing the edit region from being exposed to others.

If the electronic device determines that the special effect to be applied to the edit region has not been selected in step 707, then the electronic device may proceed to step 711 in which the electronic device may transmit the message (e.g., an input dialog) input to the input window to the counterpart user.

In contrast, if the electronic device determines that the special effect to be applied to the edit region has been selected in step 707, then the electronic device may proceed to step 709 in which the electronic device may transmit the message (input dialog) input to the input window, and information about the selected special effect to the counterpart user.

According to exemplary embodiments of the present invention, the counterpart user's terminal, that has received the input message and the information about the special effect transmitted by the electronic device, may display the received message with the special effect applied to the edit region.

If the counterpart user's terminal displays a message to which the hiding effect has been applied, the user may touch a corresponding region and input predetermined authentication information to release the hiding effect.

FIGS. 8A to 8D are diagrams illustrating screens for modifying a location of a speech balloon displayed in a chat window in an electronic device according to an exemplary embodiment of the present invention.

Referring to FIGS. 8A to 8D, the electronic device may provide an interactive messaging function by displaying a screen having a chat window and an input window.

The chat window may be a region in which speech balloons including transmitted and received messages (e.g., a dialog) are displayed.

Figure 8A:
FIGS. 8A to 8D are diagrams illustrating screens for modifying a location of a speech balloon displayed in a chat window in an electronic device according to an exemplary embodiment of the present invention.

As illustrated in FIG. 8A, the electronic device may display a plurality of speech balloons each including a message. In FIG. 8A, a chat window is displayed. The chat window includes speech balloons 801 and 803 respectively including messages (dialog) "Can we meet this Saturday?" and "If not, how about next Saturday?" that are received from a counterpart user. In addition, the chat window includes a speech balloon 805 including a message "Yes, let's see on that day" that is transmitted by the user are displayed.

Referring to FIG. 8A, it is not clear whether the message 805 "Yes, let's see on that day" corresponds to the answer for the message 801 "Can we meet this Saturday?" or to the answer for the message 803 "If not, how about next Saturday?" For example, the ordering of the displayed messages of the conversation between the user and the counterpart user creates ambiguity as to whether the user responds to the message of speech balloon 801 or the message of speech balloon 803 using the message of speech balloon 805.

Figure 8B:
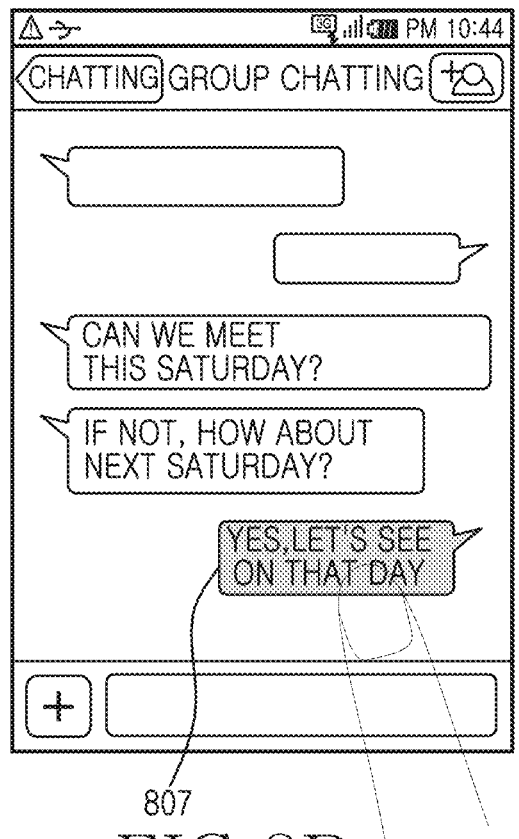

Accordingly, as illustrated in FIG. 8B, when the user wants to modify the location of a speech balloon displayed in the chat window, the user of the electronic device may select the speech balloon 807. For example, the user may select the speech balloon 807 to modify the location thereof. As illustrated in FIG. 8B, the user may select the speech balloon, the location of which is to be modified, by touching and holding the speech balloon 807 including the message "Yes, let's see on that day". According to exemplary embodiments of the present invention, the user may select a speech balloon by using an input unit, such as a mouse, an electronic pen, or the like. In addition, a particular special effect may be applied to the speech balloon selected by the user, for example, the speech balloon, the location of which is to be modified, to represent (or otherwise provide an indication of) the activation of an editing function for the speech balloon.

Figure 8C:
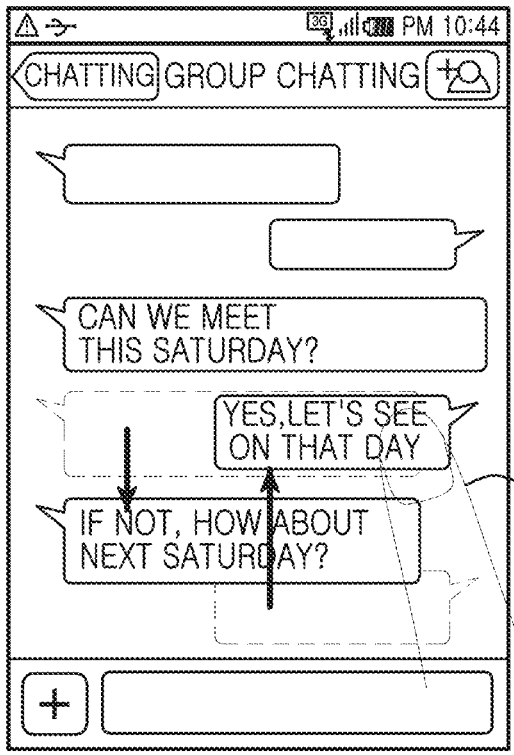

As illustrated in FIG. 8C, the user, who has selected the speech balloon, the location of which is to be modified, may select a target location 809 as a location to which the selected speech balloon 807 is to be moved.

FIG. 8C illustrates a situation in which the user has dragged the selected speech balloon 807 including the message "Yes, let's see on that day" to a target location 809 in order to locate the selected speech balloon after the speech balloon including the message "Can we meet this Saturday?" As a result of modifying the location of the dragged speech balloon, the locations of the other speech balloons may be correspondingly modified.

Figure 8D:
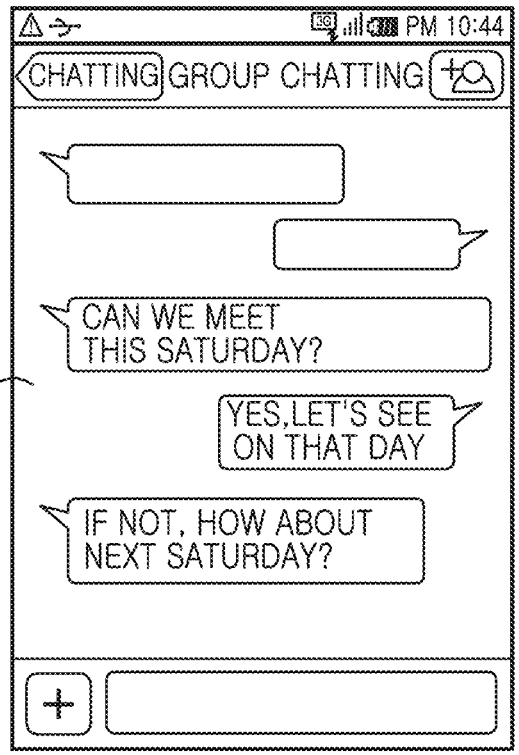

Accordingly, as illustrated in FIG. 8C, in the chat window 811 displayed by the electronic device, the locations of speech balloons may be modified. For example, as illustrated in FIG. 8D, the location of the speech balloon including the message "If not, how about next Saturday?" may be replaced with the location of the speech balloon including the message "Yes, let's see on that day". The arrangement of the messages in the chat window may be modified according to the moved messages.

Figure 9C:
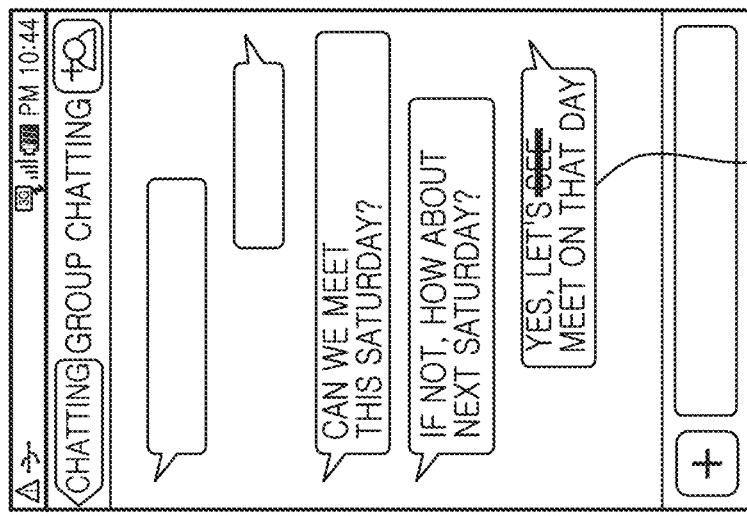
FIGS. 9A to 9C are diagrams illustrating screens for editing a message of a speech balloon in an electronic device according to an exemplary embodiment of the present invention.
Figure 9B:
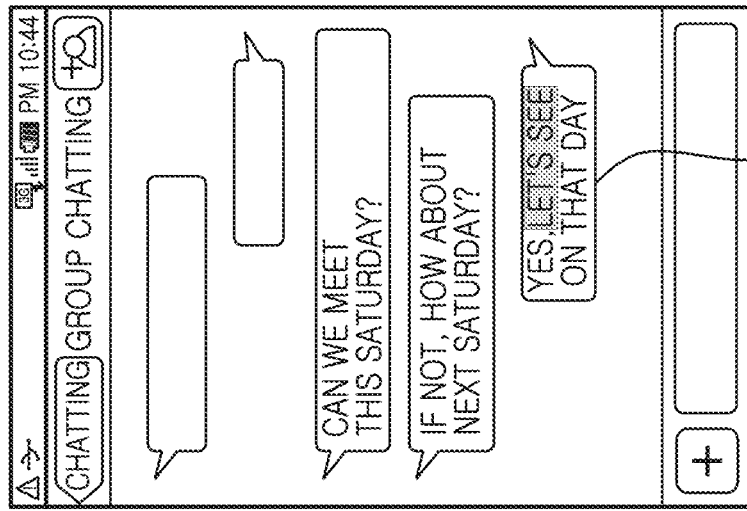
Figure 9A:
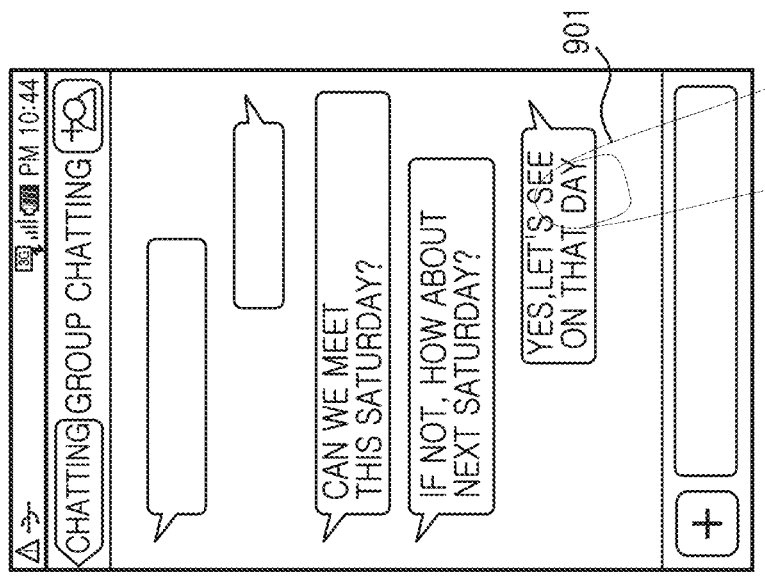

FIGS. 9A to 9C are diagrams illustrating screens for editing a message of a speech balloon in an electronic device according to an exemplary embodiment of the present invention.

Referring to FIGS. 9A to 9C, the electronic device may provide an interactive messaging function by displaying a screen having a chat window and an input window.

The chat window may be a region in which speech balloons including transmitted and received messages (e.g., a dialog) are displayed.

As illustrated in FIG. 9A, the electronic device may display a plurality of speech balloons each including a message.

Referring to FIG. 9A, if a user wants to amend a message of a speech balloon displayed in the chat window, the user 901 of the electronic device may select the speech balloon to be amended.

Referring to FIG. 9B, the electronic device apply a particular special effect 903 to the selected message ("Let's see").

After inputting a message replacing the selected message to the input window, the user may press a transmission button to transmit the input message to a counterpart user.

Accordingly, as illustrated in FIG. 9C, the electronic device may replace the message previously displayed in the chat window with a newly input message. In this case, the electronic device may apply different special effects 905 to the previously displayed message and the replaced message. For example, as illustrated in FIG. 9C, the electronic device may amend the message selected by the user from "Let's see" to "Let's meet" and output the message.

Figure 10:
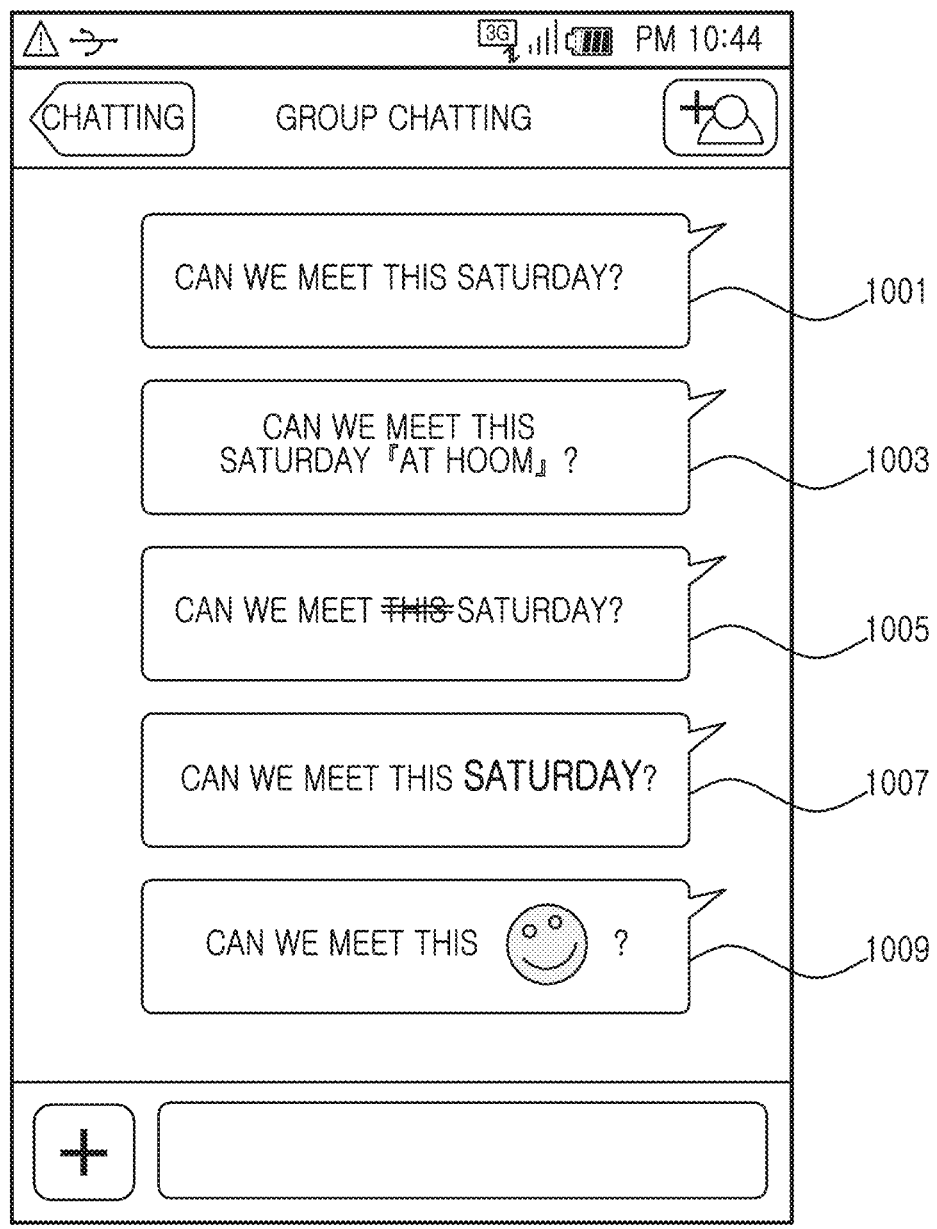
FIG. 10 is a diagram illustrating a screen for editing a message of a speech balloon in an electronic device according to an exemplary embodiment of the present invention.

FIG. 10 is a diagram illustrating a screen for editing a message of a speech balloon in an electronic device according to an exemplary embodiment of the present invention.

Referring to FIG. 10, the electronic device may provide an interactive messaging function by displaying a screen having a chat window and an input window.

The chat window may be a region in which speech balloons including transmitted and received messages (e.g., a dialog) are displayed.

FIG. 10 illustrates a speech balloon 1001 including a message "Can we meet this Saturday?" and speech balloons (e.g., speech balloons 1005 to 1009) to which special effects have been applied by a user. The special effects may include a strike-through, a highlighting of characters, a bolding of characters, an increase in font/character size, an insertion of a special character or image, hiding of a selected character, word, or message, and the like.

FIG. 10 also illustrates a speech balloon 1003 to which a particular message is added. For example, when a message "at home" is added in the middle of the message "Can we meet this Saturday?", an addition location may be selected by using touch input, electronic pen input, key input, or the like, and, thereafter, the message to which particular icons (for example, 「」) have been applied may be added to the message 1003 which states "Can we meet this Saturday?"

According to exemplary embodiments of the present invention, the speech balloon to which the special effect has been applied may include a speech balloon 10005 from which a particular message is deleted. For example, when a message "this" is deleted from the message "Can we meet this Saturday?", the message to be deleted is selected by using touch input, electronic pen input, key input, or the like and, thereafter, a deletion icon (e.g., strike through) is applied to the message to display the deletion of the message.

According to exemplary embodiments of the present invention, the speech balloon to which the special effect has been applied may include a speech balloon 1007 in which a particular message is highlighted. For example, when a message "Saturday" is highlighted among the message "Can we meet this Saturday?", the message to be highlighted is selected by using touch input, electronic pen input, key input, or the like and, thereafter, a highlighting effect (e.g., letter magnification) is applied to the message to enable the message to be highlighted.

According to exemplary embodiments of the present invention, the speech balloon to which the special effect has been applied may include a speech balloon 1009 in which a particular message has been hidden. For example, when a message "Saturday" is hided among the message "Can we meet this Saturday?", the message to be hidden is selected by using touch input, electronic pen input, key input, or the like and, thereafter, a hiding effect (e.g., mosaic processing, application of particular special icon) is applied to the message to enable the message to be hidden.

According to exemplary embodiments of the present invention, when a message to be edited is selected, the electronic device displays a list of special effects applicable to the message. In this case, the list of special effects may include message highlighting, deletion, addition, hiding, or the like.

According to exemplary embodiments of the present invention, a user who selects a message to be edited may perform an operation corresponding to a special effect such that the special effect can be applied to the message. For example, after selecting a message to be edited, the user may perform a touch input, such as a drawing of "+", to activate a function for adding a message.

Figures 11A, 11B, 11C:
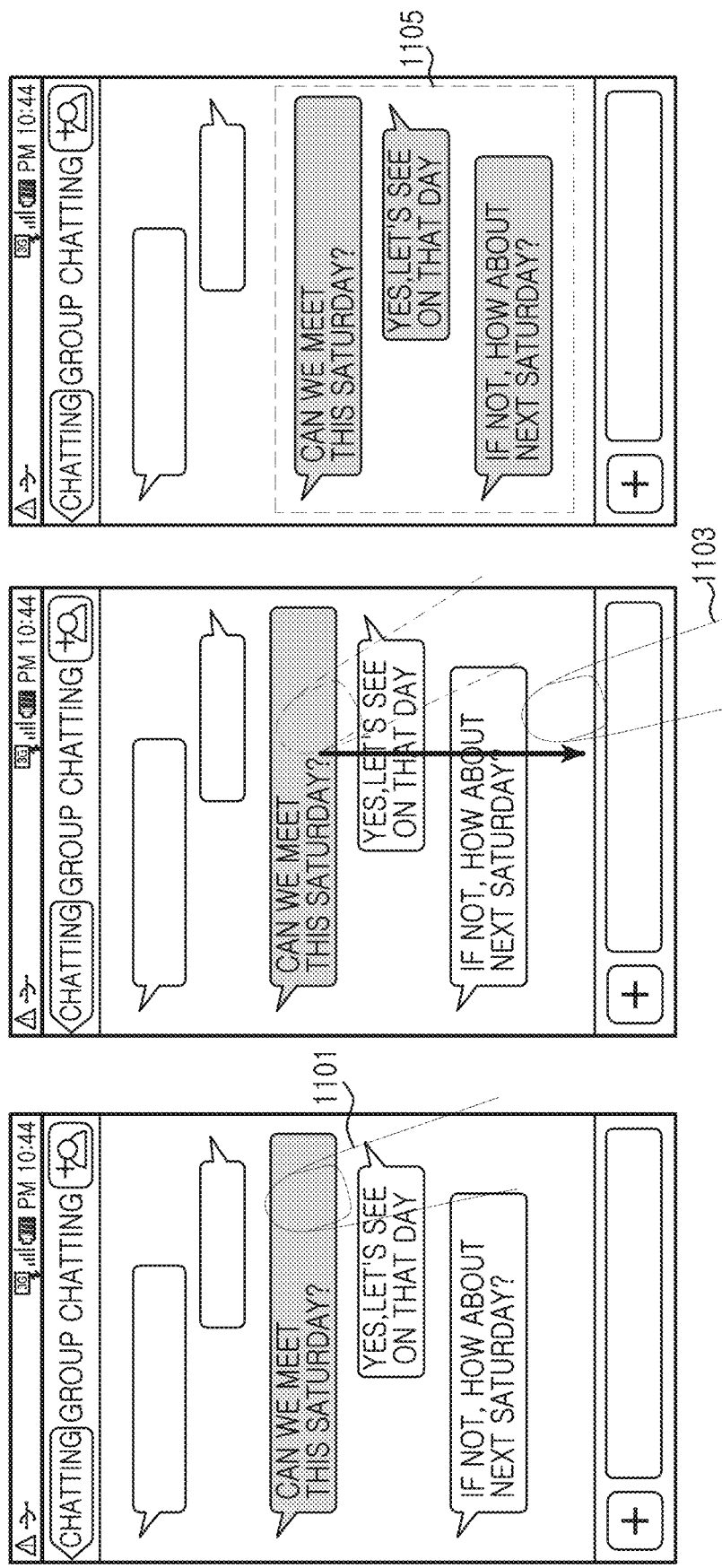
FIGS. 11A to 11C are diagrams illustrating screens for performing block setting on a speech balloon in an electronic device according to an exemplary embodiment of the present invention.

FIGS. 11A to 11C are diagrams illustrating screens for performing block setting on a speech balloon in an electronic device according to an exemplary embodiment of the present invention.

Referring to FIGS. 11A to 11C, the electronic device may provide an interactive messaging function by displaying a screen having a chat window and an input window.

The chat window may be a region in which speech balloons including transmitted and received messages (e.g., dialog) are displayed.

As illustrated in FIG. 11A, the electronic device may display a plurality of speech balloons each including a message. FIG. 11 illustrates a chat window in which speech balloons respectively including messages "Can we meet this Saturday?" and "If not, how about next Saturday?" that are received from a counterpart user, and a speech balloon including a message "Yes, let's see on that day" that is transmitted by the user are displayed.

The electronic device may copy a message included in a speech balloon. However, messages available for copy are limited to all messages within speech balloons and messages selected by the user. For example, the electronic device may generally be unable to select a plurality of speech balloons (e.g., at one time).

However, according to exemplary embodiments of the present invention, the electronic device may select a plurality of speech balloons and copy or combine the messages of the selected speech balloons.

As illustrated in FIG. 11A, the user 1101 may select a reference speech balloon. As illustrated in FIG. 11B, the user 1103 may select a plurality of speech balloons through touch movement. For example, the user may select the speech balloon including the message "Can we meet this Saturday?" and, thereafter, perform touch movement through the speech balloon including the message "If not, how about next Saturday?" to the speech balloon including the message "Yes, let's see on that day".

As illustrated in FIG. 11C, electronic device that has detected the touch movement by the user may apply a particular special effect to the speech balloons 1105 through which the touch input of the user passes, to indicate that the speech balloons are set as one block. The special effect may include highlighting or otherwise shading the selected messages, displaying a box around the selected messages, and the like.

Figures 12A, 12B, 12C:
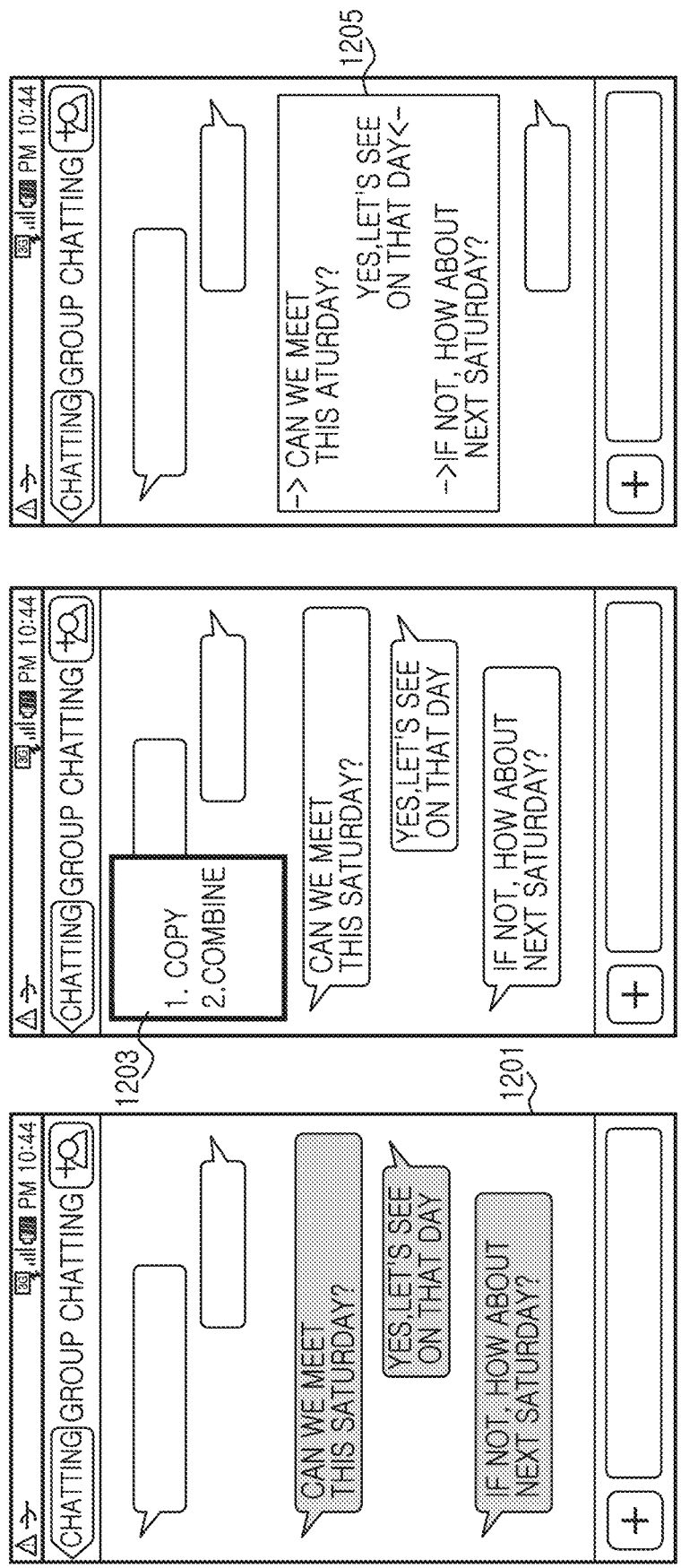
FIGS. 12A to 12C are diagrams illustrating screens for editing a speech balloon in an electronic device according to an exemplary embodiment of the present invention.

FIGS. 12A to 12C are diagrams illustrating screens for editing a speech balloon in an electronic device according to an exemplary embodiment of the present invention.

Referring to FIGS. 12A to 12C, the electronic device may provide an interactive messaging function by displaying a screen having a chat window and an input window.

As illustrated in FIG. 12A, a plurality of speech balloons displayed in the chat window 1201 may be set to one block according to, for example, the method described with reference to FIGS. 11A to 11C.

As illustrated in FIG. 12A, the speech balloons set as one block may be combined into one speech balloon.

In addition, the speech balloons set as one block as illustrated in FIG. 12A may be copied to another application at one time.

For example, as illustrated in FIG. 12B, when the plurality of speech balloons is set as one block, a menu 1203 for processing the set block may be displayed.

According to exemplary embodiments of the present invention, if the user wants to copy the set block, the messages of the speech balloons set as the block may be stored in a buffer and then used for other applications.

According to exemplary embodiments of the present invention, if the user wants to combine the speech balloons of the set block, as illustrated in FIG. 12C, the messages of the speech balloons set as the block are combined into one speech balloon 1205. As an example, an indication for distinguishing between transmission and reception may be displayed together with the messages of the combined speech balloon.

FIGS. 13A to 13C are diagrams illustrating screens for transmitting a message to which a special effect has been applied in an electronic device according to an exemplary embodiment of the present invention.

Referring to FIGS. 13A to 13C, the electronic device may provide an interactive messaging function by displaying a screen having a chat window and an input window.

The chat window may be a region on which speech balloons including transmitted and received messages (e.g., a dialog) are displayed. The input window may be a region to which a message (e.g., a dialog) to be transmitted is input.

As illustrated in FIG. 13A, the user of the electronic device may input a message 1301 to be transmitted to a counterpart user to the input window.

Generally, when the user inputs a message to the input window and then presses a transmission button, the message input to the input window may be transmitted to a counterpart user and, at substantially the same time, the message input to the input window may be displayed in the chat window.

Some users may be reluctant to expose the content of the message transmitted to the counterpart user to others. Accordingly, the user may transmit the message, which should not be exposed to others, in a hidden format, thereby protecting the user's privacy. According to exemplary embodiments of the present invention, the hidden format or effects relating thereto can be applied to the message displayed in the user's chat window and/or to the message transmitted to the counterpart user.

As an example, as illustrated in FIG. 13B, the user may set a region 1303 of a message for a privacy protection function and hide the region as illustrated As an example, the electronic device may hide a message by using a mosaic effect, an animation effect, or the like.

In addition, the user of the electronic device may set authentication information required to check (e.g., unhide or otherwise provide access to) the content of the hidden message and a hint for the authentication information to transmit the same to the counterpart user. The electronic device may set authentication information to the content of the hidden message because the content of the message is allowed to be checked (e.g., read) by using the information known only to the user of the electronic device and the counterpart user.

For example, the user who wants to transmit a message may set an anniversary (e.g., a first meeting date) related to the counterpart user as authentication information and set hint information of "When we met first?" in the hidden message. Accordingly, when the counterpart user selects the hidden message, the counterpart user's electronic device may pop-up the hint information of "When we met first?" and then receive the authentication information from the user. When correct information is input from the user (or the counterpart user), the content of the hidden message may be displayed.

In addition, the electronic device may enable the content of the hidden message to be checked by using information set by the counterpart user's electronic device. The reason for enabling the content of the hidden message to be checked by using information set by the counterpart user's electronic device is to enable the content of the message to be checked by using a password set in the counterpart user's electronic device. The password set in the electronic device may be a password set to restrain the operation of the electronic device or a password set in an interactive message.

For example, the counterpart user's electronic device, which has received the message hidden by the user, displays the message in the chat window in the hidden format. When the user (or counterpart user) selects the hidden message, the counterpart user's electronic device may display a screen for input of a password.

In this case, the user (or counterpart user) inputs a preset password to allow the content of the hidden message to be displayed.

As illustrated in FIG. 13C, the electronic device, which has received the message from a user who transmits the hidden message, may display the received message 1305.

In this case, the electronic device which has received the message, may display the message having the hidden format.

Figure 14B:
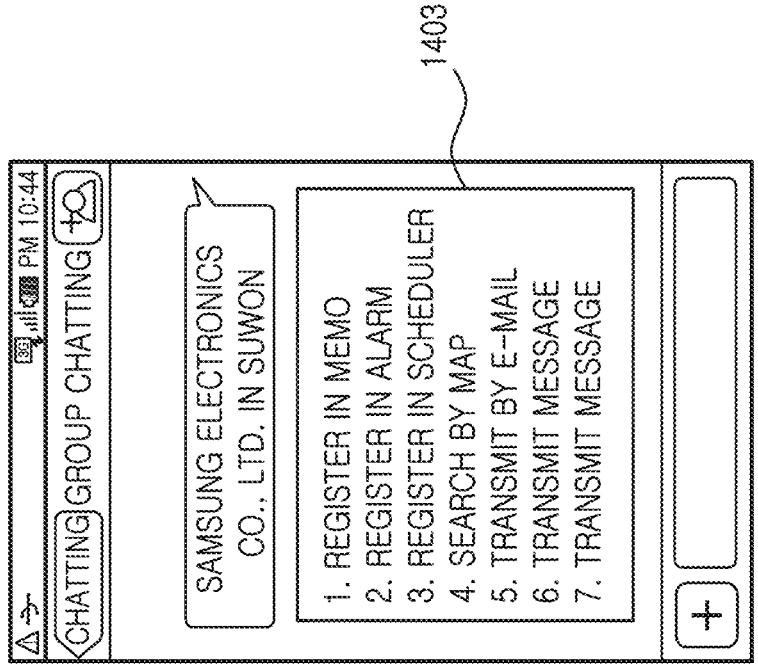
FIGS. 14A and 14B are diagrams illustrating a process for association of a message in an electronic device according to an exemplary embodiment of the present invention.
Figure 14A:
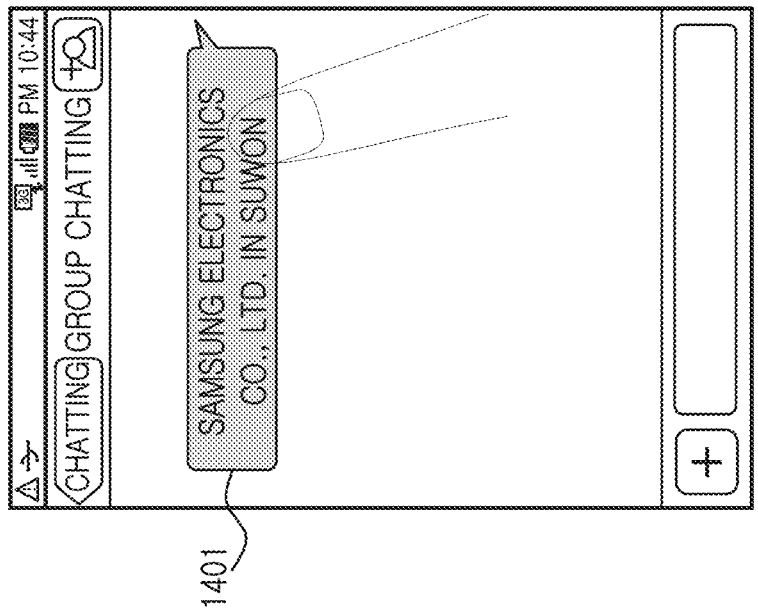

FIGS. 14A and 14B are diagrams illustrating a process for association of a message in an electronic device according to an exemplary embodiment of the present invention.

Referring to FIGS. 14A and 14B, the electronic device may provide an interactive messaging function by displaying a screen having a chat window and an input window.

The chat window may be a region on which speech balloons including transmitted and received messages (e.g., a dialog) are displayed. The input window may be a region to which a message to be transmitted is input.

As illustrated in FIG. 14A, if a user selects a message 1401 displayed in the chat window, then, as illustrated in FIG. 14B, the electronic device may display a list 1403 of functions associated with the message.

According to exemplary embodiments of the present invention, the functions associated with the message may include a function for storing the content of the message in a memo, a function for registering the content of the message in an alarm or a schedule, a function for searching for an area included in the message by map, a function for transmitting the content of the message by e-mail, a function for transmitting the content of the message by message, a function for searching for a phone number included in the message or searching for a phone number of a company included in the message, or the like.

FIGS. 14A and 14B illustrate a situation in which a user selects Samsung Electronics Co., Ltd. in Suwon included in the message and a list of associated functions are displayed.

In addition, the electronic device may provide not only the chat window but also the message input to the input window and the list of associated functions.

FIGS. 15A to 15C are diagrams illustrating screens for displaying a speech balloon in a chat window in an electronic device according to an exemplary embodiment of the present invention.

Referring to FIGS. 15A to 15C, the electronic device may provide an interactive messaging function by displaying a screen having a chat window and an input window.

The chat window may be a region in which speech balloons including transmitted and received messages (e.g., dialog) are displayed.

As illustrated in FIG. 15A, the electronic device may display a plurality of speech balloons each of which includes a message. For example, FIG. 15A illustrates the chat window in which speech balloons 1501 and 1503 respectively including messages "Can we meet this Saturday?" and "If not, how about next Saturday?" that are received from a counterpart user, and a speech balloon 1505 including a message "Yes, let's see on that day" that is transmitted by a user, are displayed.

Referring to FIG. 15A, it is not clear whether the message 1505 "Yes, let's see on that day" corresponds to the answer for the message 1501 "Can we meet this Saturday?" or to the answer for the message 1503 "If not, how about next Saturday?".

Referring to FIG. 15B, the user may select speech balloons for grouping 1509 among the speech balloons displayed in the chat window. For example, grouping speech balloons corresponds to displaying speech balloons associated with each other. The speech balloons associated with each other may be a speech balloon corresponding to a question and a speech balloon corresponding to an answer.

As illustrated in FIG. 15A, the user 1507 selects the speech balloon 1501 including the message "Can we meet this Saturday?" and the speech balloon 1505 including the message "Yes, let's see on that day." Accordingly, the electronic device may group the selected speech balloons.

In this case, grouping the selected speech balloons may correspond to displaying the selected speech balloons to be distinguished from the other speech balloons (e.g., the speech balloons not grouped or associated with the grouped speech balloons) by modifying the shape or color of the selected speech balloons. In addition, the electronic device may flicker the selected speech balloons such that the grouped speech balloons are distinguished from the others.

Referring to FIG. 15B, the electronic device modifies the shape of the speech balloons 1509 selected by the user. FIG. 15B illustrates that the speech balloon including the message "Yes, let's see on that day" is associated with the speech balloon including the message "Can we meet this Saturday?"

Referring to FIG. 15C, the electronic device may connect the speech balloons selected by the user by a line 1511 so as to display the association between the selected speech balloons. In this case, in order to distinguish among speech balloon associations, the line connecting the speech balloons may have a different color or transparency from other speech balloons associated with each other or indications of associations thereof. For example, FIG. 15C illustrates that the speech balloon including the message "Yes, let's see on that day" is associated with the speech balloon including the message "Can we meet this Saturday?" by using the line connecting the speech balloons.

Figure 16A:
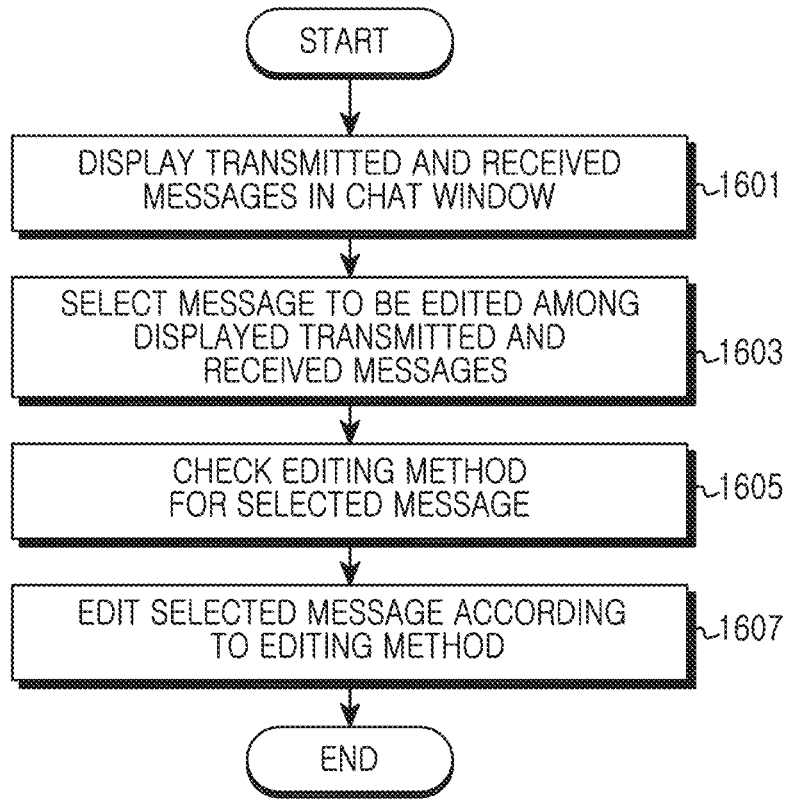
FIG. 16A is a flowchart illustrating a process for editing a message in an electronic device according to an exemplary embodiment of the present invention.

FIG. 16A is a flowchart illustrating a process for editing a message in an electronic device according to an exemplary embodiment of the present invention.

Referring to FIG. 16A, in step 1601, the electronic device may perform an operation for displaying transmitted and received messages in a chat window. According to exemplary embodiments of the present invention, the operation for displaying the transmitted and received messages in the chat window may be an operation for arranging and outputting the transmitted and received messages by using a messaging function in chronological order.

In step 1603, the electronic device may perform an operation for selecting a message to be edited among the displayed transmitted and received messages. According to exemplary embodiments of the present invention, the operation for selecting the message to be edited among the displayed transmitted and received messages may be an operation for receiving a message of which the location is to be modified. As another example, the operation for selecting the message to be edited among the displayed transmitted and received messages may be a step for selecting a message with typing errors, a message including a content to be highlighted, a message into which a message is to be interested, or a message including a content to be hidden. As another example, the operation for selecting the message to be edited among the displayed transmitted and received messages may be a step for selecting a reference message in order to select a plurality of messages to be combined.

In step 1605, the electronic device may perform an operation for checking an editing method for the selected message. According to exemplary embodiments of the present invention, the operation for checking the editing method for the selected message may be a step for modifying the location and content of the selected message or checking whether to combine a plurality of messages.

In step 1607, the electronic device may perform an operation for editing the selected message according to the editing method. According to exemplary embodiments of the present invention, the operation for editing the selected message according to the editing method may be a step for modifying the location and content of the message selected by a user or combining a plurality of messages.

Instruction sets for respective operations in FIG. 16A may be included in a messaging program or an editing program in the memory 210 of FIG. 2, and the programs may be executed by at least one processor.

Figure 16B:
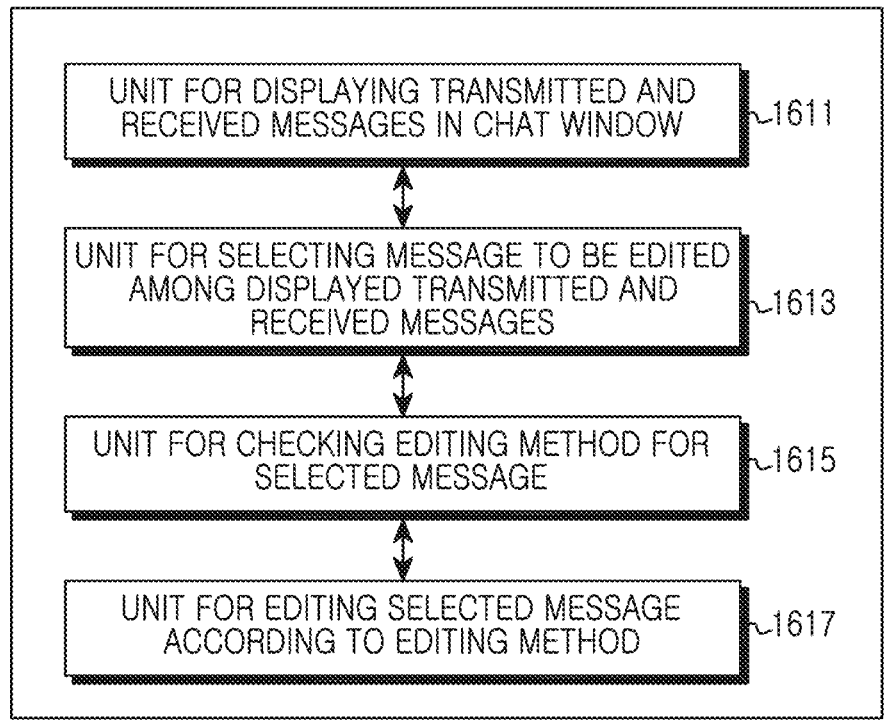
FIG. 16B is a diagram illustrating an apparatus for performing a step of editing a message according to an exemplary embodiment of the present invention.

FIG. 16B is a diagram illustrating an apparatus for performing a step of editing a message according to an exemplary embodiment of the present invention.

Referring to FIG. 16B, the apparatus includes a unit 1611 for displaying transmitted and received messages in a chat window. The unit 1611 arranges the transmitted and received messages by using a messaging function in chronological order, and displays the transmitted and received messages in the chat window.

The apparatus also includes unit 1613 for selecting the message to be edited among the displayed transmitted and received messages. The unit 1613 may perform an operation for receiving a message of which the location is to be modified. As another example, the unit 1613 may perform an operation for selecting a message with typing errors, a message including content to be highlighted, a message to which a message is to be added, or a message including content to be hidden.

According to exemplary embodiments of the present invention, the unit 1613 may perform an operation for selecting a reference message in order to select a plurality of messages to be combined.

The apparatus also includes unit in step 1615 for checking the editing method for the selected message. The unit 1615 may perform an operation for modifying the location and content of the selected message or determining whether to combine a plurality of messages.

The apparatus also includes unit in step 1617 for editing the selected message according to the editing method. The unit 1617 may perform an operation for modifying the location and content of the message selected by a user, or for combining a plurality of messages.

According to exemplary embodiments of the present invention, the units 1611 to 1617 may be configured in separate hardware components, or combined into or configured as one hardware component.

In addition, a method for editing a message in an electronic device according to various exemplary embodiments of the present invention may include a step for displaying transmitted and received messages in a chat window, a step for detecting selection of a message to be edited among the displayed transmitted and received messages, and a step for editing the selected message according to an editing method for the selected message.

According to exemplary embodiments of the present invention, the editing method for the selected message may include at least one of message grouping, message location modification, message addition, message deletion, message highlighting, message hiding, message combination, and application association.

According to exemplary embodiments of the present invention, the step for editing the selected message may include a step for receiving selection of at least one message to be grouped with the selected message and a step for displaying the selected messages as a group.

According to exemplary embodiments of the present invention, the step for displaying the selected messages as a group may include at least one of a step for modifying a shape of the selected message, a step for modifying the color of the selected message, and a step for connecting the selected messages with a line.

According to exemplary embodiments of the present invention, the step for editing the selected message may include a step for checking a movement location of the selected message, and a step for moving the selected message to the checked location.

According to exemplary embodiments of the present invention, the step for editing the selected message may include a step for receiving selection of a region to be edited in the selected message, a step for receiving a message replacing the selected region, and a step for replacing the message of the selected region with the received message.

According to exemplary embodiments of the present invention, the step for editing the selected message may include a step for receiving selection of at least one message to be combined with the selected message, and a step for combining the selected messages into one message.

According to exemplary embodiments of the present invention, the method for editing a message in the electronic device may include a step for editing a message to be transmitted and transmitting the edited message.

As described above, exemplary embodiments of the present invention allow a user to edit transmitted and received messages displayed in a chat window. Exemplary embodiments of the present invention group messages associated with each other, and/or correct typing errors of the transmitted and received messages, thus improving the performance of a messaging function.

It will be appreciated that exemplary embodiments of the present invention according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present invention. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments of the present invention provide a program comprising code for implementing apparatus or a method as claimed in any one of the claims of this specification and a machine-readable storage storing such a program.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable communication device comprising:
a touchscreen display;
communication circuitry; and
at least one processor configured to:
  establish, using the communication circuitry, a communication connection with an external electronic device,
  receive a text input via the touchscreen display,
  present a text corresponding to the text input via the touchscreen display,
  receive, via the touchscreen display, a first user input selecting the text to apply an effect,
  in response to the first user input selecting the text to apply an effect, present a list of a plurality of effects via the touchscreen display, the list of the plurality of effects comprising a hiding effect, hiding the inputted text,
  receive, via the touchscreen display, a second user input with respect to the list to select an effect of the plurality of effects,
  in response to the second user input, present, via the touchscreen display, a graphical object applying the selected effect to the text, and
  transmit, via the communication connection, a message including text information corresponding to the text and effect information corresponding to the selected effect in response to a transmission request.

2. The portable communication device of claim 1, wherein the at least one processor is further configured to:
prior to the receiving of the text input, present, via the touchscreen display, a user interface corresponding to a message application, the user interface including a chat window and a text input window.

3. The portable communication device of claim 2, wherein the at least one processor is further configured to:
perform the presenting of the text in the text input window, and
perform the presenting of the graphical object in the chat window.

4. The portable communication device of claim 1, wherein the at least one processor is further configured to:
as at least part of the presenting of the list of the plurality of effects, present a first graphical indication corresponding to a hiding effect and a second graphical indication corresponding to an emphasizing effect,
wherein the hiding effect includes a first effect applying a mosaic to the text, and
wherein the emphasizing effect includes a second effect changing a size of the text.

5. The portable communication device of claim 1, wherein the at least one processor is further configured to:
receive, via the touchscreen display, a third user input with respect to the graphical object, and
in response to the third user input, present the text via the touchscreen display.

6. The portable communication device of claim 1, wherein the at least one processor is further configured to:
receive, via the communication connection, an additional message from the external electronic device, the additional message including an additional text information and an additional effect information, and
present, via the touchscreen display, an additional graphical object applying an additional effect corresponding to the additional effect information to an additional text corresponding to the text information.

7. The portable communication device of claim 6, wherein the at least one processor is further configured to:
based at least in part on a determination that the additional effect information corresponds to a hiding effect, perform the presenting of the additional graphical object by applying the hiding effect to the additional text, and
based at least in part on a determination that the additional effect information corresponds to an emphasizing effect, perform the presenting of the additional graphical object by changing a size of the additional text.

8. The portable communication device of claim 7, wherein the at least one processor is further configured to:
based at least in part on a determination that the additional message does not include the additional effect information, perform the presenting of the additional text without applying any effects.

9. The portable communication device of claim 6, wherein the at least one processor is further configured to:
receive, via the touchscreen display, a fourth user input with respect to the additional graphical object, and
present the additional text via the touchscreen display.

10. A portable communication device comprising:
a touchscreen display;
communication circuitry; and
at least one processor configured to:
  establish a communication connection with an external electronic device using the communication circuitry,
  receive, via the communication connection, a message from the external electronic device, the message including text information and effect information,
  present, via the touchscreen display, a graphical object applying an effect corresponding to the effect information to a text corresponding to the text information,
  receive, via the touchscreen display, a user input with respect to the graphical object,
  in response to receiving the user input with respect to the graphical object, present a list of a plurality of effects via the touchscreen display, the list of the plurality of effects comprising a hiding effect, hiding the inputted text, and
  present the text via the touchscreen display.

11. The portable communication device of claim 10, wherein the at least one processor is further configured to:

based at least in part on a determination that the effect information corresponds to a hiding effect, perform the presenting of the graphical object by applying the hiding effect to the text, and based at least in part on a determination that the other effect information corresponds to a size changing effect, perform the presenting of the graphical object by changing a size of the text.

12. The portable communication device of claim 11, wherein the hiding effect includes a mosaic effect.

13. The portable communication device of claim 10, wherein the at least one processor is further configured to:
based at least in part on a determination that the message does not includes the effect information, perform the text corresponding to the text information without applying any effects.

14. The portable communication device of claim 10, wherein the at least one processor is further configured to:
as at least part of the presenting of the graphical object, present, via the touchscreen display, a user interface corresponding to a message application, the user interface including a chat area and a text input area, and
perform the presenting of the graphical object in the chat area.

15. The portable communication device of claim 14, wherein the at least one processor is further configured to:
receive, via the touchscreen display, a text input in the text input area,
in response to the text user input, present, via the touchscreen display, an additional text corresponding to the text input in the text input area,
receive, via the touchscreen display, an additional user input to apply an additional effect to the additional text, and
in response to the additional user input, present, via the touchscreen display, an additional graphical object by applying the additional effect to the additional text.

16. The portable communication device of claim 15, wherein the at least one processor is further configured to:
as at least part of the receiving of the additional user input, present a list of plurality of effects via the touchscreen display, and
receive, via the touchscreen display, a third user input to select the additional effect among the plurality of effects as at least part of the additional user input.

17. The portable communication device of claim 15, wherein the at least one processor is further configured to:
transmit, via the communication connection, an additional message including an additional text information corresponding to the additional text and an additional effect information corresponding to the additional effect.

18. A portable communication device comprising:
a touchscreen display;
communication circuitry; and
at least one processor configured to:
establish, using the communication circuitry, a communication connection for communicating with an external electronic device,
receive a text input via the touchscreen display,
display a text corresponding to the text input via the touchscreen display,
receive, via the touchscreen display, a first user input for applying an effect to the text,
in response to the first user input for applying an effect to the text, display, via the touchscreen display, a list of one or more graphical effects including a text-hiding effect,
receive, via the touchscreen display, a second user input to select the text-hiding effect from the list,
in response to the second user input, display, via the touchscreen display, the text as the text-hiding effect is applied thereto, and
transmit, using the communication circuitry, a message including text information corresponding to the text and effect information corresponding to the text-hiding effect to the external electronic device in response to a transmission request.

19. The portable communication device of claim 18, wherein the at least one processor is further configured to:
receive, via the touchscreen display, a third user input with respect to the text as the text-hiding effect is applied thereto, and
in response to the third user input, display, via the touchscreen display, the text as the text-hiding effect is removed therefrom.

20. The portable communication device of claim 18, wherein the one or more graphical effects include a text-emphasizing effect, and
wherein the at least one processor is further configured to:
as at least part of the displaying of the list of the one or more graphical effects, display a first graphical indication corresponding to the text-hiding effect and a second graphical indication corresponding to the text-emphasizing effect.

21. The portable communication device of claim 20, wherein the at least one processor is further configured to:
receive, via the touchscreen display, a third user input to select the text-emphasizing effect from the list, and
in response to the third user input, display, via the touchscreen display, the text as the text-emphasizing effect is applied thereto instead of the text-hiding effect.

22. The portable communication device of claim 21, wherein the at least one processor is further configured to:
perform the displaying of the text as a respective one of the text-hiding effect and the text-emphasizing effect is applied thereto, in a form of a graphical speech-balloon.

* * * * *